US012348950B2

(12) United States Patent
Fontana et al.

(10) Patent No.: US 12,348,950 B2
(45) Date of Patent: Jul. 1, 2025

(54) AUDIO DEVICE AND METHOD FOR GENERATING A THREE-DIMENSIONAL SOUNDFIELD

(71) Applicant: Huawei Technologies Co., Ltd., Shenzhen (CN)

(72) Inventors: Simone Fontana, Munich (DE); Jiang Li, Shenzhen (CN); Peter Grosche, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 241 days.

(21) Appl. No.: 17/845,616

(22) Filed: Jun. 21, 2022

(65) Prior Publication Data

US 2022/0322021 A1 Oct. 6, 2022

Related U.S. Application Data

(63) Continuation of application No. PCT/EP2019/086757, filed on Dec. 20, 2019.

(51) Int. Cl.
*H04S 7/00* (2006.01)
*H04R 1/02* (2006.01)
(Continued)

(52) U.S. Cl.
CPC ............. *H04S 7/302* (2013.01); *H04R 1/025* (2013.01); *H04R 3/04* (2013.01); *H04R 3/14* (2013.01);
(Continued)

(58) Field of Classification Search
CPC .......... H04S 7/302; H04S 3/002; H04S 3/008; H04S 2400/01; H04S 2400/03;
(Continued)

(56) References Cited

U.S. PATENT DOCUMENTS 4,179,008 A * 12/1979 LeTourneau ........... H04R 1/403
181/147
5,809,150 A 9/1998 Eberbach
(Continued)

FOREIGN PATENT DOCUMENTS

CN 103888889 A 6/2014
JP H0819089 A 1/1996
(Continued)

OTHER PUBLICATIONS

"Philips Fidelio SoundRing wireless speaker," XP055696931, Retrieved from the Internet May 19, 2020, URL: https://www.philips.com.ph/c-p/DS3880W_10/fidelio-soundring-wireless-speaker, Retrieved (Sep. 23, 2012).
(Continued)

*Primary Examiner* — Daniel R Sellers
(74) *Attorney, Agent, or Firm* — Leydig, Voit & Mayer, Ltd.

(57) ABSTRACT

An audio device for providing an improved three-dimensional sound experience by means of the generated soundfield is provided. The audio device comprises a housing, which has an elliptical torus shape and a plurality of loudspeakers, and a processing circuitry. The processing circuitry is configured to process a plurality of input signals (L, R, UL, UR) in a manner, which enables the plurality of loudspeakers to form at least a first (DH1, DH3) and second (DH2) horizontal dipoles for crosstalk cancellation within at least two different frequency ranges (HF, MF), and to form at least a first vertical dipole (DV1, DV3) for sound elevation of the soundfield. Hereby, a desired frequency ranges (HF, MF) may be adjusted using an appropriated distance of the plurality of loudspeakers.

20 Claims, 21 Drawing Sheets

(51) Int. Cl.

| | |
|---|---|
| ***H04R 3/04*** | (2006.01) |
| ***H04R 3/14*** | (2006.01) |
| ***H04R 5/02*** | (2006.01) |
| ***H04R 5/04*** | (2006.01) |
| ***H04S 3/00*** | (2006.01) |

(52) U.S. Cl.
CPC ................. *H04R 5/02* (2013.01); *H04R 5/04* (2013.01); *H04S 3/002* (2013.01); *H04S 3/008* (2013.01); *H04S 2400/01* (2013.01); *H04S 2400/03* (2013.01); *H04S 2420/01* (2013.01)

(58) Field of Classification Search
CPC ....... H04S 2420/01; H04R 1/025; H04R 3/04; H04R 3/14; H04R 5/02; H04R 5/04
USPC ......................................... D14/212, 215, 216
See application file for complete search history.

(56) References Cited

U.S. PATENT DOCUMENTS

| | | | | |
|---|---|---|---|---|
| 8,345,883 | B2 | 1/2013 | Takumai et al. | |
| 8,511,422 | B2 * | 8/2013 | Adams | H04R 1/025 181/197 |
| D700,168 | S | 2/2014 | Bolton | |
| 9,479,853 | B1 * | 10/2016 | Marquette | F04D 25/06 |
| 9,596,544 | B1 * | 3/2017 | Brotherton | H04R 19/02 |
| 9,762,999 | B1 * | 9/2017 | Johnson | H04R 1/403 |
| 9,877,131 | B2 | 1/2018 | Grosche et al. | |
| 2005/0141723 | A1 | 6/2005 | Lee et al. | |
| 2005/0201583 | A1 | 9/2005 | Colich | |
| 2006/0159288 | A1 | 7/2006 | Stiles et al. | |
| 2009/0010469 | A1 * | 1/2009 | Tracy | H04R 1/403 381/338 |
| 2014/0205100 | A1 | 7/2014 | Faller et al. | |
| 2016/0037260 | A1 | 2/2016 | Faller et al. | |
| 2016/0286329 | A1 * | 9/2016 | Grosche | H04R 5/02 |
| 2017/0006379 | A1 * | 1/2017 | Falourd | H04R 3/04 |
| 2017/0238090 | A1 * | 8/2017 | Johnson | H04R 1/025 381/335 |
| 2018/0317034 | A1 | 11/2018 | Orth et al. | |
| 2020/0314537 | A1 * | 10/2020 | Strunk | H04R 1/403 |
| 2021/0306786 | A1 * | 9/2021 | Walther | H04R 29/002 |

FOREIGN PATENT DOCUMENTS

| | | | |
|---|---|---|---|
| JP | 2003264895 | A | 9/2003 |
| JP | 2008104022 | A | 5/2008 |
| JP | 2017046309 | A | 3/2017 |
| WO | 2015086040 | A1 | 6/2015 |
| WO | 2018211984 | A1 | 11/2018 |

OTHER PUBLICATIONS

Rabenstein et al., "Wave Field Synthesis Techniques for Spatial Sound Reproduction," Topics in Acoustic Echo and Noise Control, Chapter 13, Publisher: Springer, Editors: Haensler, E. and Schmidt, G, Total 29 pages (Jan. 2006).

Olivieri et al., "Generation of private sound with a circular loudspeaker array and the weighted pressure matching method," IEEE/ACM Transactions on Audio, Speech, and Language Processing 25, Total 13 pages, Institute of Electrical and Electronics Engineers, New York, New York (2017).

Zhang et al., "Three Dimensional Sound Field Reproduction using Multiple Circular Loudspeaker Arrays: Functional Analysis Guided Approach," IEEE/ACM Transactions on Audio, Speech, and Language Processing, vol. 22, No. 7, Total pp. 11, Institute of Electrical and Electronics Engineers, New York, New York (Jul. 2014).

Chun et al., "Upmixing Stereo Audio into 5.1 Channel Audio for Improving Audio Realism," Total 8 pages (2009).

* cited by examiner

PRIOR ART

30

Right Channel Dipole: No signal to left ear

Left Channel Dipole: No signal to right ear

AUDIO DEVICE AND METHOD FOR GENERATING A THREE-DIMENSIONAL SOUNDFIELD

CROSS-REFERENCE TO RELATED APPLICATIONS

This application is a continuation of International Application No. PCT/EP2019/086757, filed on Dec. 20, 2019, the disclosure of which is hereby incorporated by reference in its entirety.

TECHNICAL FIELD

The present disclosure relates to audio processing and sound generation. More specifically, the present disclosure relates to an audio device comprising a plurality of loudspeakers for generating a three-dimensional soundfield as well as a corresponding method.

BACKGROUND

Soundbars comprising a plurality of transducers are well-established for different media applications, such as soundbars for television, smartphones and tablet computers. However, many of these conventional audio solutions are not perceived pleasant to the user. In particular, this is because many of these applications do not provide a comfortable 3D audio experience to the user.

FIG. 1 illustrates a conventional audio soundbar 30 having a linear array of transducers. Such audio devices may basically provide an improved three-dimensional (3D) audio experiences to the user.

There is a need for an audio device and method providing an improved three-dimensional sound experience.

SUMMARY

The disclosure provides an audio device as well as a corresponding method allowing for an improved three-dimensional sound experience.

Embodiments of the disclosure are achieved by the subject matter of the independent claims. Further implementations are apparent from the dependent claims, the description and the figures.

According to a first aspect, the present disclosure relates to an audio device for generating a three-dimensional soundfield. The audio device comprises a housing having an elliptical torus shape and a plurality of loudspeakers. Moreover, the audio device comprises processing circuitry configured to process a plurality of input signals to obtain a plurality of output signals and output the plurality of output signals to the plurality of loudspeakers. The processing circuitry is configured to process the plurality of input signals such that: a first pair of the plurality of loudspeakers form a first dipole for crosstalk cancellation between left hand side signal components and right hand side signal components in a first frequency range of the soundfield: a second pair of the plurality of loudspeakers form a second dipole for crosstalk cancellation between left hand side signal components and right hand side signal components in a second frequency range of the soundfield; and a third pair of the plurality of loudspeakers form a third dipole for sound elevation of the soundfield. The first frequency range extends to higher frequencies than the second frequency range, i.e., the upper bound of the first frequency range is larger than the upper bound of the second frequency range, and a distance between the loudspeakers of the plurality of loudspeakers forming the first dipole is smaller than a distance between the loudspeakers of the plurality of loudspeakers forming the second dipole.

Thus, the audio device according to the first aspect allows to provide an improved three-dimensional sound experience by employing a first and a second dipole for crosstalk cancellation and a third dipole for sound elevation. Embodiments of the audio device have a toroidal housing and loudspeakers may be implemented in the housing. The soundfield may comprise a main radiation direction, which is based on the specific orientation of the loudspeakers mounted in the housing. Hereby, the main radiation direction may define an area proximate to which a listener may perceive a preferably high-quality 3D audio experience. The elliptical torus shape comprises as a specific case a circular torus shape. The elliptical, in particular circular arrangement of the loudspeakers within the toroidal housing may additionally define a compact geometry that may be useful for improved handling. Moreover, the elliptical, in particular circular arrangement of the loudspeakers enables to accommodate the loudspeakers in a manner, which enables to realize variable dipole distances in both horizontal and vertical directions. This allows to accurately adapt the frequency ranges of the soundfield according to the respective listener's needs by adapting the dipole distances of the horizontal and vertical dipoles accordingly. Additionally, using a plurality of horizontal dipoles and vertical dipoles having different dipole distances based on the elliptical, in particular circular arrangement enables the use of a preferably high total frequency bandwidth regarding both crosstalk cancellation portions and sound elevation portions. The loudspeakers can be coplanar or at least substantially coplanar and can be shared for horizontal and vertical dipole processing. Embodiments of the present disclosure also provide a portable and wearable audio device. Embodiments of the present disclosure also provide an accommodation area within the opening regime of the elliptical torus shape that may potentially be associated with a television (TV) or another image or video device. According to some of these embodiments, the view direction of such a visual device may be adapted in accordance with the main radiation direction of the soundfield.

As used herein, "crosstalk cancellation" refers to an audio technique for delivering virtual 3D sound to a listener via two or more loudspeakers, wherein source signals are preprocessed prior to loudspeaker reproduction in order to ensure that first (e.g., left hand side) signal components of the loudspeakers may be prepared for and transmitted to a first ear (e.g., left ear) of the listener, and second (e.g., right hand side) signal components of the loudspeakers may be prepared for and transmitted to a second ear (e.g., right ear) of the listener different from the first ear. In doing so, virtually a substantial portion of acoustic crosstalk, in ideal circumstances all acoustic crosstalk, is cancelled out at the other ear and no significant reverberation is present. According to some embodiments, an angle $\Delta\gamma$ defined by the propagation direction of dipoles formed for the first ear relative to the propagation direction of dipoles formed for the second ear may be in the range of $0° \leq \Delta\gamma \leq 15°$.

In further (opposite) embodiments, the first signal components may be right hand side signal components and the first ear may be the right ear and the second signal components may be left hand side signal components and the second ear may be the left ear. For ease of understanding, the following description will describe embodiments, where the first signal components are the left hand side signal components and the first ear the left ear and the second signal components are the right hand side signal components and the second ear is the right ear, however all explanations correspondingly also apply to opposite embodiments.

As used herein, “sound elevation” refers to the perception of sound originating from sound sources, wherein the sound perception occurs at positions outside the two-dimensional (2D) horizontal plane. Audio techniques for delivering such virtual 3D sound to a listener use, for instance, reflections by the ceiling of a room for simulating virtual source(s) located at a greater, i.e., “elevated” height than the original source (s). According to some embodiments, a propagation direction of a sound elevation portion of the soundfield may be adapted in accordance with dimensions of a type of location for which the machine is provided. According to some embodiments, angles $\Delta\beta_1$ and $\Delta\beta_2$, respectively defined by a normal vector of a main plane defined by the elliptical torus shape of the housing and the propagation direction of the sound elevation portion of the soundfield may be in a range of $0°\leq\Delta\beta_1\leq75°$ and $0°\leq\Delta\beta_2\leq75°$, wherein the propagation direction of the sound elevation portion of $\Delta\beta_1$ may be directed upwards and the propagation direction of the sound elevation portion of $\Delta\beta_2$ may be directed downwards. In certain embodiments, angles $\Delta\beta_1$ and $\Delta\beta_2$ may be in a range of $20°\leq\Delta\beta_1\leq60°$ and $20°\leq\Delta\beta_2\leq60°$. In certain embodiments, angles $\Delta\beta_1$ and $\Delta\beta_2$ may be in a range of $40°\leq\Delta\beta_1\leq50°$ and $40°\leq\Delta\beta_2\leq50°$. The exemplary ranges indicate herein enable a preferably good 3D sound experience to a listener having a preferably designated distance from the loudspeakers of the audio device. According to some embodiments, such preferably designated distance from the loudspeakers may be in a range extending from 100 cm to 400 cm.

The first frequency range may at least partially overlap the second frequency range. Alternatively, the first frequency range and the second frequency range may be non-overlapping. The second frequency range may extend to lower frequencies than the first frequency range. Further, a median frequency value of the second frequency range may be smaller than a median frequency value of the first frequency range.

The plurality of loudspeakers may be evenly distributed along the elliptical torus shaped housing. The first pair of loudspeakers forming the first dipole for crosstalk cancellation and the second pair of loudspeakers forming the second dipole for crosstalk cancellation may be arranged in the elliptical torus shaped housing such that the first dipole extends in a parallel or at least substantially parallel displaced orientation to the second dipole. The first pair of loudspeakers forming the first dipole for crosstalk cancellation and the third pair of loudspeakers forming the third dipole for sound elevation may be arranged in the elliptical torus shaped housing such that the first dipole extends in a perpendicular or at least substantially perpendicular orientation to the third dipole. The second pair of loudspeakers forming the second dipole for crosstalk cancellation and the third pair of loudspeakers forming the third dipole for sound elevation may be arranged in the elliptical torus shaped housing such that the second dipole extends in a perpendicular or at least substantially perpendicular orientation to the third dipole.

As used herein, “substantially horizontal”, “substantially vertical”, “substantially parallel”, “substantially perpendicular” and similar expressions define a respective angular orientation with a deviation of less than 35°, less than 25°, less than 15°, or less than 5° from a strict horizontal, vertical, parallel or perpendicular angular orientation. According to some embodiments, these terminologies may be used to correlate geometrical and structural aspects of the audio device with each other in a relative manner. According to further embodiments, these terminologies may be used to correlate sound emission aspects of the audio device with each other in a relative manner. According to some embodiments, these terminologies may be used to correlate geometrical and structural aspects of the audio device with sound emission aspects of the audio device in a relative manner.

The elliptical torus shaped housing may be configured to be arranged in an operation orientation such that a main plane defined by the housing, i.e., the plurality of loudspeakers mounted in the housing is a vertical or at least a substantially vertical plane. Hereby, the operation direction may be defined and aligned, respectively by a user, who intends to listen to the soundfield of the audio device. For instance, the housing of the audio device may be configured to be mounted to a wall or placed on a table such that in the operation orientation the plane defined by the housing is a vertical or at least substantially vertical plane. In the operation orientation of the audio device, the first pair of loudspeakers may form a first horizontal or at least substantially horizontal dipole for crosstalk cancellation, the second pair of loudspeakers may form a second horizontal or at least substantially horizontal dipole for crosstalk cancellation, which is located parallel or at least substantially parallel to the first horizontal or at least substantially horizontal dipole, but at a different vertical height than the first horizontal or at least substantially horizontal dipole, and the third pair of loudspeakers form a vertical or at least substantially vertical dipole for sound elevation of the soundfield, which is orientated perpendicular or at least substantially perpendicular to the first and/or second horizontal or at least substantially horizontal dipoles.

According to further implementations, the first frequency range (e.g., first audio frequency range) comprises a high frequency (HF) range and/or the second frequency range (e.g., second audio frequency range) comprises a mid frequency (MF) range. Advantageously, this allows providing crosstalk cancellation in the HF range by the first dipole having the smaller dipole distance. Further, this allows providing crosstalk cancellation in the MF range by the second dipole having the larger dipole distance. Thus, the crosstalk cancellation is achieved (at least more accurately) over a larger total frequency range. According to some implementations, the MF range may be within a range of $10^2$ Hz$\leq$MF$\leq10^4$ Hz and/or the HF range may be above $10^3$ Hz. Such an acoustic dipole distance may be defined as the distance in between the positions of two acoustic transducers forming an acoustic dipole.

In a further possible implementation of the first aspect, at least one loudspeaker of the first or second pair of loudspeakers is also part of the third pair of loudspeakers. Advantageously, this allows synergistically using one or more of the plurality of loudspeakers for more than one dipole and thereby enables a more compact housing as well as a less complex technical implementation.

In a further possible implementation of the first aspect, the housing mounting the plurality of loudspeakers has a circular torus shape. Thus, the use of identical or at least similar dipole distances in a horizontal and vertical direction is enabled, which consequently enables to transmit identical or at least similar dipole frequencies regarding both crosstalk cancellation portions of the soundfield and sound elevation portions of the soundfield. This may be considered pleasant by a listener listening to the soundfield of the audio device and improve the overall audio quality. Additionally, similar dipole frequencies regarding both crosstalk cancellation portions of the soundfield and sound elevation portions of the soundfield may be even achieved in this case using at least partly the same loudspeakers regarding both vertical and horizontal dipole. In doing so, the number of loudspeakers required for providing crosstalk cancellation and for sound elevation may additionally be minimized.

In a further possible implementation of the first aspect, an arrangement of the loudspeakers of the plurality of loudspeakers forming the first dipole defines a first dipole orientation and arrangement of the loudspeakers of the plurality of loudspeakers forming the third dipole defines a third dipole orientation, wherein a first dipole orientation angle $\eta 1$ defined by the third dipole orientation relative to the first dipole orientation is in a range of $65° \leq \eta 1 \leq 115°$. Thereby, it is enabled to provide an improved three-dimensional sound experience by expanding well-established two-dimensional crosstalk cancellation technique by means of additional sound elevation portions providing an additional dimension of the soundfield, wherein the sound elevation portions are transmitted in specific angular directions, in which they minimally affect dipole fields relating to crosstalk cancellation. Consequently, three-dimensional sound experience may be achieved without significantly interfering with the well-established crosstalk cancellation technique.

As used herein, the "dipole orientation" may be defined as an arrangement of loudspeakers forming an acoustic dipole relative to each other. According to some embodiments, the dipole orientation refers to an arrangement of two loudspeakers relative to each other. According to some embodiments, the dipole orientation refers to the orientation of a connecting line in between two loudspeakers forming an acoustic dipole. According to some embodiments, this connecting line is not restricted to a specific direction and therefore includes both the connection in between a first loudspeaker and a second loudspeaker and vice versa.

As used herein, the "main radiation direction" of the 3D soundfield generated by the audio device may be defined as an area proximate to which a listener may perceive a preferably high-quality 3D audio experience. According to some embodiments, the main radiation direction may be the direction of the main power output of the soundfield generated by the audio device. According to some embodiments, the main radiation direction may be parallel or at least substantially parallel to the normal vector of the main plane defined by the elliptical torus shape of the housing. According to some further embodiments, the main radiation direction may in the operation position be perpendicular or at least substantially perpendicular to the main plane.

In a further possible implementation of the first aspect, the processing circuitry is configured to process the plurality of input signals such that a fourth pair of the plurality of loudspeakers form a fourth dipole for crosstalk cancellation between left hand side signal components and right hand side signal components in the fourth frequency range of the soundfield, wherein a distance between the loudspeakers of the plurality of loudspeakers forming the fourth dipole is smaller than a distance between the loudspeakers of the plurality of loudspeakers forming the second dipole, i.e., the second dipole distance. Hereby, the fourth frequency range may extend to higher frequencies than the second frequency range and a distance between the loudspeakers of the plurality of loudspeakers forming the fourth dipole may be smaller than a distance between the loudspeakers of the plurality of loudspeakers forming the second dipole.

In doing so, the covered frequency range corresponding to the frequency portions of the crosstalk cancellation portions of the soundfield may be increased in certain cases. In particular, this may be the case if the fourth frequency range is not identical with the first frequency range (but may still have a certain overlapping regime).

Alternatively, the signal strength within at least a portion of the first frequency range or within a portion of the second frequency range may also be increased in certain cases. In particular, this may be the case if the first frequency range is at least partially identical with the fourth frequency range.

The distance between the loudspeakers of the plurality of loudspeakers forming the fourth dipole may be identical or at least substantially identical to the distance between the loudspeakers of the plurality of loudspeakers forming the first dipole, i.e., the first dipole distance. The fourth pair of loudspeakers forming the fourth dipole for crosstalk cancellation may be arranged in the elliptical torus shaped housing such that the fourth dipole extends in a parallel or at least substantially parallel displaced orientation to the first and/or second dipole and/or in a perpendicular or at least substantially perpendicular orientation to the third dipole. In the operation position of the audio device, the fourth pair of loudspeakers may form a fourth horizontal or at least substantially horizontal dipole for crosstalk cancellation, which is located parallel or at least substantially parallel to the first and second horizontal or at least substantially horizontal dipole, but at a different vertical height than the first and second horizontal or at least substantially horizontal dipole.

In a further possible implementation of the first aspect, the processing circuitry is configured to process a first subset of the plurality of input signals to obtain the left hand side signal components, wherein for obtaining the output signals for the first pair of loudspeakers and the second pair of loudspeakers, the processing circuitry is configured to:

- apply a bandpass filtering to the left hand side signal components to obtain the left hand side signal components in the first frequency range and the left hand side signal components in the second frequency range;
- apply a first dipole processing using a1) a first equalizing to the left hand side signal components in the first frequency range for obtaining a first component of the output signal for a first loudspeaker of the first pair of loudspeakers and using a2) the first equalizing, an inverting and a delaying to the left hand side signal components in the first frequency range signal for obtaining a first component of the output signal for a second loudspeaker of the first pair of loudspeakers; and
- apply a second dipole processing using b1) a second equalizing to the left hand side signal components in the second frequency range for obtaining a first component of the output signal for the first loudspeaker of the second pair of loudspeakers and using b2) the second equalizing, an inverting and a delaying to the left hand side signal components in the second frequency range for obtaining a first component of the output signal for the second loudspeaker of the second pair of loudspeakers. This allows for an efficient generation of the output signals for operating the first pair of loudspeakers and the second pair of loudspeakers as the first dipole and the second dipole, respectively.

As used herein, "bandpass filtering" refers to the signal processing technique of processing an input signal into one or more output signals, wherein the one or more output signals are identical or at least substantially identical to the input signal in one or more selected frequency ranges or bands, but otherwise zero or at least substantially zero. Bandpass filtering may be provided, for instance, using crossover filters providing one or more output signals. According to some implementations, such bandpass filtering means may enable to maintain several frequency ranges (e.g., high frequency range and mid frequency range) at the same time, while setting a remaining frequency range to zero or at least substantially zero. In doing so, a common bandpass filtering unit for maintaining both high frequency ranges and mid frequency ranges may be used.

As used herein, "equalizing" refers to the signal processing technique of equalizing an input signal using an equalization filter, wherein the left and right hand side signal components in the first and second frequency range are filtered to equalize, i.e., flatten the frequency response of the respective first and second dipole. According to some embodiments, first equalizing refers to equalizing input signals using a first equalization filter in a first frequency range. According to some embodiments, second equalizing refers to equalizing input signals using a second equalization filter in a second frequency range. According to some implementations, the first equalization filter and the second equalization filter may be different filters. According to some further implementations, the first equalization filter and the second equalization filter may be unique filters. According to some implementations, first equalizing and second equalizing may be performed by the same equalization filter.

In a further possible implementation of the first aspect, the processing circuitry is further configured to process the first subset of the plurality of input signals to obtain the right hand side signal components, wherein for obtaining the output signals for the first pair of loudspeakers and the second pair of loudspeakers, the processing circuitry is further configured to:

apply the bandpass filtering to the right hand side signal components to obtain the right hand side signal components in the first and second frequency range;

apply a third dipole processing using c1) an equalizing to the right hand side signal components in the second frequency range for obtaining a second component, i.e., right hand side component, of the output signal for the second loudspeaker of the first pair of loudspeakers and using c2) the equalizing, an inverting and a delaying to the right hand side signal components in the first frequency range for obtaining a second component of the output signal for the first loudspeaker of the first pair of loudspeakers; and apply a fourth dipole processing using d1) an equalizing to the right hand side signal components in the second frequency range for obtaining a second component of the output signal for the second loudspeaker of the second pair of loudspeakers and using d2) the equalizing, an inverting and a delaying to the right hand side signal components in the second frequency range for obtaining a second component of the output signal for the first loudspeaker of the second pair of loudspeakers. This allows for an efficient generation of the output signals for operating the first pair of loudspeakers and the second pair of loudspeakers as the first dipole and the second dipole, respectively.

In a further possible implementation of the first aspect, for obtaining channel signals, i.e., the left and right hand side signal components, the processing circuitry is further configured to apply a binauralizing based on a convolution of each input signal of the first subset of the plurality of input signals with a first binaural filter and a second binaural filter to obtain a first and a second binaurally filtered version of the respective input signal; and to apply downmixing to generate the left and right hand side signal components based on the first and second binaurally filtered version of each input signal.

Thereby, an improved 3D sound perception may be achieved using preferably simple technical means.

As used herein, "binauralizing" refers to the audio signal processing technique of applying a left ear head-related transfer function (HRTF) filter and a right ear head-related transfer function (HRTF) filter to an input signal. Such HRTF filter capture the transfer path characteristics of sound sources positioned in space and the human ears and may be used to create a virtual 3D sound perception.

According to some embodiments, binauralizing may also be applied within signal processing in order to obtain vertical dipole signals, which may then be used for sound elevation of the soundfield. According to some embodiments, downmixing may also be applied within signal processing in order to obtain vertical dipole signals, which may then be used for sound elevation of the soundfield.

In a further possible implementation of the first aspect, the processing circuitry is configured to process the plurality of input signals such that the third pair of the plurality of loudspeakers form the third dipole for sound elevation in a third frequency range of the soundfield and a fifth pair of the plurality of loudspeakers form a fifth dipole for sound elevation in a fifth frequency range of the soundfield, wherein the third frequency range extends to higher frequencies than the fifth frequency range and a distance between the loudspeakers of the plurality of loudspeakers forming the third dipole, i.e., the third dipole distance, is smaller than a distance between the loudspeakers of the plurality of loudspeakers forming the fifth dipole, i.e., the fifth dipole distance. Advantageously, this allows for an even more efficient sound elevation in the third frequency range and the fifth frequency range of the soundfield.

The fifth pair of loudspeakers forming the fifth dipole for sound elevation may be arranged in the elliptical torus shaped housing such that the fifth dipole extends in a parallel or at least substantially parallel displaced orientation to the third dipole and/or in a perpendicular or at least substantially perpendicular orientation to the first and/or second dipole. In the operation position of the audio device, the fifth pair of loudspeakers may form a fifth vertical or at least substantially vertical dipole for sound elevation, which is located parallel or at least substantially parallel to the third vertical or at least substantially vertical dipole.

In a further possible implementation of the first aspect, the third frequency range may correspond to the first frequency range and/or the fifth frequency range may correspond to the second frequency range. The third frequency range may comprise a high frequency (HF) range and/or the fifth frequency range may comprise a mid frequency (MF) range.

In a further possible implementation of the first aspect, the plurality of input signals comprise vertical left hand side signal components, wherein for obtaining the output signals for the third pair of loudspeakers and the fifth pair of loudspeakers the processing circuitry is configured to:

apply a bandpass filtering to the vertical left hand side signal components to obtain the vertical left hand side signal components in the first frequency range and the vertical left hand side signal components in the second frequency range;

apply a fifth dipole processing using e1) an equalizing to the vertical left hand side signal components in the first frequency range for obtaining the output signal for a first loudspeaker of the third pair of loudspeakers and using e2) the equalizing, an inverting and a delaying to the vertical left hand side signal components in the first frequency range for obtaining the output signal for a second loudspeaker of the third pair of loudspeakers; and apply a sixth dipole processing using f1) an equalizing to the vertical left hand side signal components in the second frequency range for obtaining a first component of the output signal for a first loudspeaker of the fifth pair of loudspeakers and using d2) the equalizing, an inverting and a delaying to the vertical left hand side signal components in the second frequency range for obtaining a first component of the output signal for a second loudspeaker of the fifth pair of loudspeakers. This allows for an efficient generation of the output signals for operating the third pair of loudspeakers and the fifth pair of loudspeakers as the third dipole and the fifth dipole, respectively.

In a further possible implementation of the first aspect, the processing circuitry is configured to process the plurality of input signals such that the second pair of the plurality of loudspeakers and a further pair of the plurality of loudspeakers form the second dipole, wherein a first loudspeaker of the further pair of loudspeakers is arranged in the housing adjacent to a first loudspeaker of the second pair of loudspeakers and a second loudspeaker of the further pair of loudspeakers is arranged in the housing adjacent to a second loudspeaker of the second pair of loudspeakers. Advantageously, this allows for a more efficient crosstalk cancellation in the second, e.g., MF frequency range.

In a further possible implementation of the first aspect, the processing circuitry is configured to process the plurality of input signals such that the first loudspeaker of the second pair of loudspeakers and the first loudspeaker of the further pair of loudspeakers form a seventh dipole for sound elevation of the soundfield and/or the second loudspeaker of the second pair of loudspeakers and the second loudspeaker of the further pair of loudspeakers form an eighth dipole for sound elevation of the soundfield.

According to a second aspect, the present disclosure relates to a corresponding method for generating a three-dimensional soundfield using an audio device with a housing having an elliptical torus shape and a plurality of loudspeakers. The method comprises the steps of processing a plurality of input signals to obtain a plurality of output signals and outputting the plurality of output signals to the plurality of loudspeakers. The plurality of input signals are processed such that: a first pair of the plurality of loudspeakers form a first dipole for crosstalk cancellation between left hand side signal components and right hand side signal components in a first frequency range of the soundfield: a second pair of the plurality of loudspeakers form a second dipole for crosstalk cancellation between left hand side signal components and right hand side signal components in a second frequency range of the soundfield; and a third pair of the plurality of loudspeakers form a third dipole for sound elevation of the soundfield. The first frequency range extends to higher frequencies than the second frequency range and a distance between the loudspeakers of the plurality of loudspeakers forming the first dipole, i.e., a first dipole distance, is smaller than a distance between the loudspeakers of the plurality of loudspeakers forming the second dipole, i.e., a second dipole distance.

The second aspect comprises implementations, which correspond to the implementations according to the first aspect.

In a further implementation according to the second aspect, the method may be configured to be executed by an audio device according to any of the embodiments disclosed herein.

According to a third aspect, the present disclosure relates to a computer program product comprising a non-transitory computer-readable storage medium carrying program code which causes a computer or a processor to perform the method according to the second aspect of the present disclosure when the program code is executed by the computer or the processor.

Details of one or more embodiments are set forth in the accompanying drawings and the description below. Other features, objects, and advantages will be apparent from the description, drawings, and claims.

BRIEF DESCRIPTION OF THE DRAWINGS

In the following embodiments of the present disclosure are described in more detail with reference to the attached figures and drawings, in which.

Figure 1:
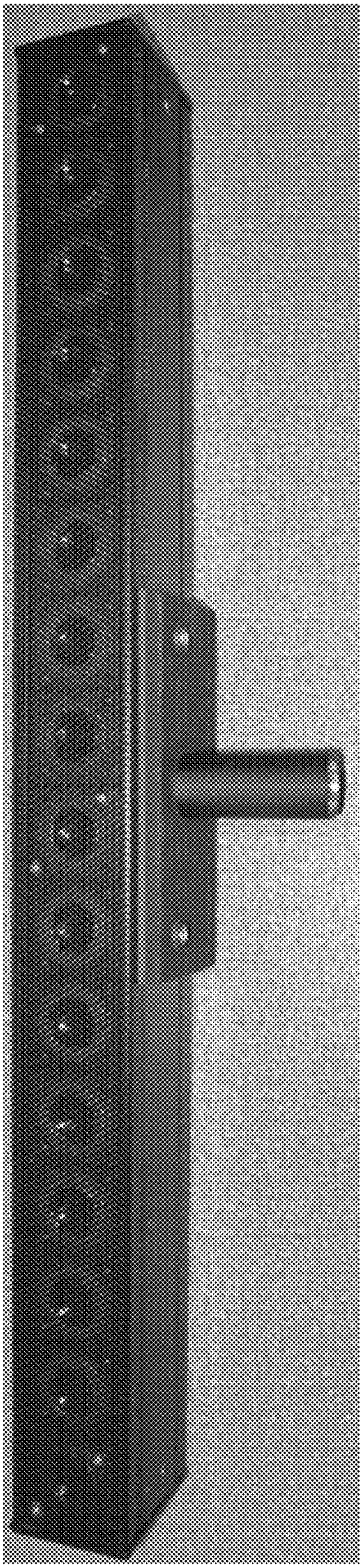
FIG. 1 illustrates a conventional audio device having a linear array of loudspeakers.

In the following identical reference signs refer to identical or at least functionally equivalent features.

DETAILED DESCRIPTION

In the following description, reference is made to the accompanying figures, which form part of the disclosure, and which show, by way of illustration, specific aspects of embodiments of the present disclosure or specific aspects in which embodiments of the present disclosure may be used. It is understood that embodiments of the present disclosure may be used in other aspects and comprise structural or logical changes not depicted in the figures. The following detailed description, therefore, is not to be taken in a limiting sense, and a plurality of preferred embodiments according to the present disclosure are defined in the appended claims.

For instance, it is to be understood that a disclosure in connection with a described method may also hold true for a corresponding device or system configured to perform the method and vice versa. For example, if one or a plurality of specific method steps are described, a corresponding device may include one or a plurality of units, e.g., functional units, to perform the described one or plurality of method steps (e.g., one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g., functional units, a corresponding method may include one step to perform the functionality of the one or plurality of units (e.g., one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

In the following, some theoretical background will be provided, which will be helpful for understanding aspects of exemplary embodiments of the audio device and method according to the present disclosure, before describing some exemplary embodiments of the audio device and method in greater detail.

According to well-established technical background, the simplest audio dipole source consist of two audio point sources (also referred to as "monopoles") of equal strength operating at the same frequency but vibrating 180 degrees out of phase with each other. In practice, an audio dipole can be obtained by driving two transducers, i.e., loudspeakers with the same signal, but with an inverted phase. Mathematically, an audio dipole can be expressed in the following way. If x(t) denotes the signal for driving the dipole, then $y_1(t)=x(t)$ can be the signal for driving the first monopole of the dipole and $y_2(t)=-x(t)$ can be the signal for driving the second monopole.

Figure 2:
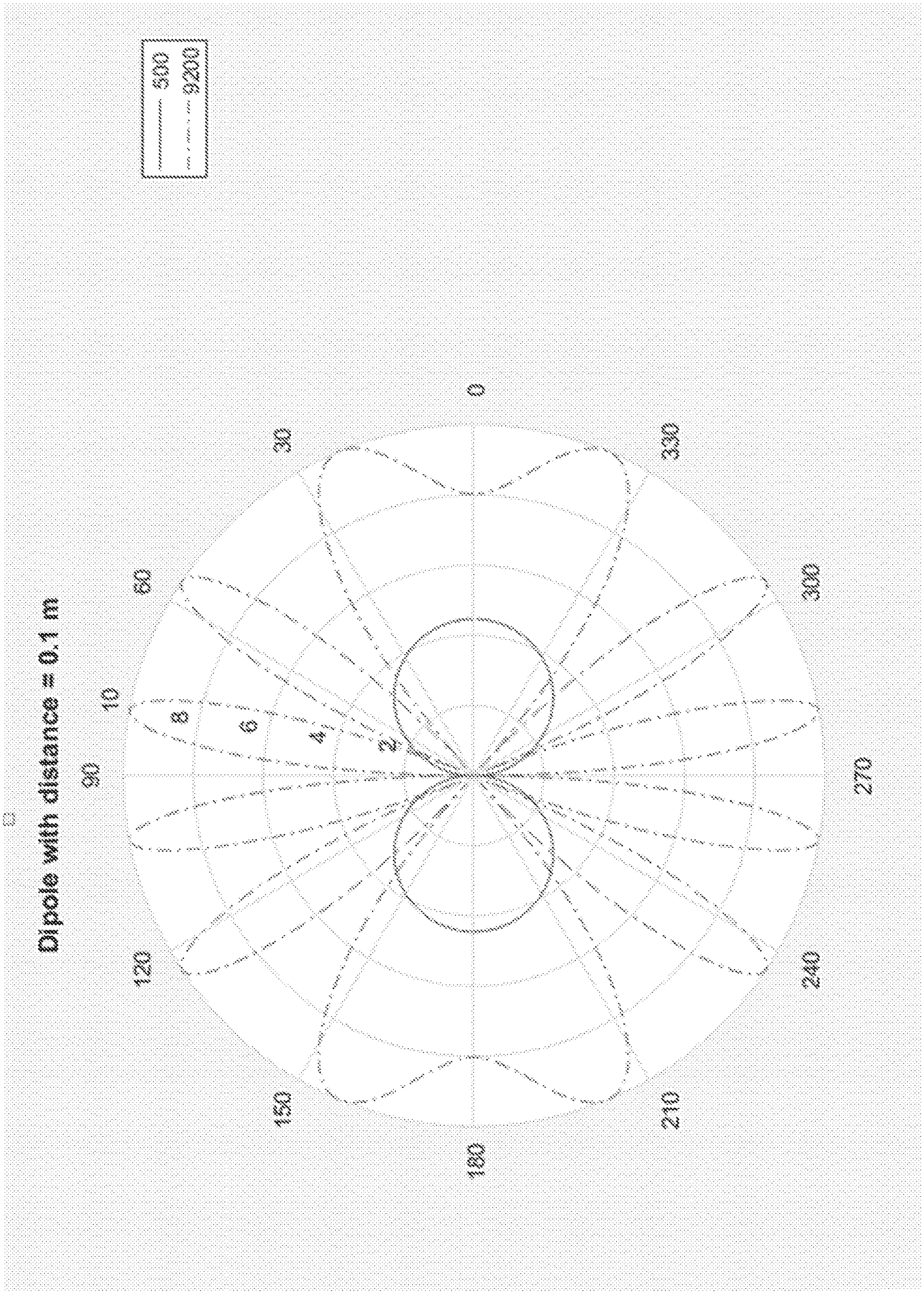
FIG. 2 illustrates a polar diagram indicating the directional dipole response at different frequencies.
Figure 3:
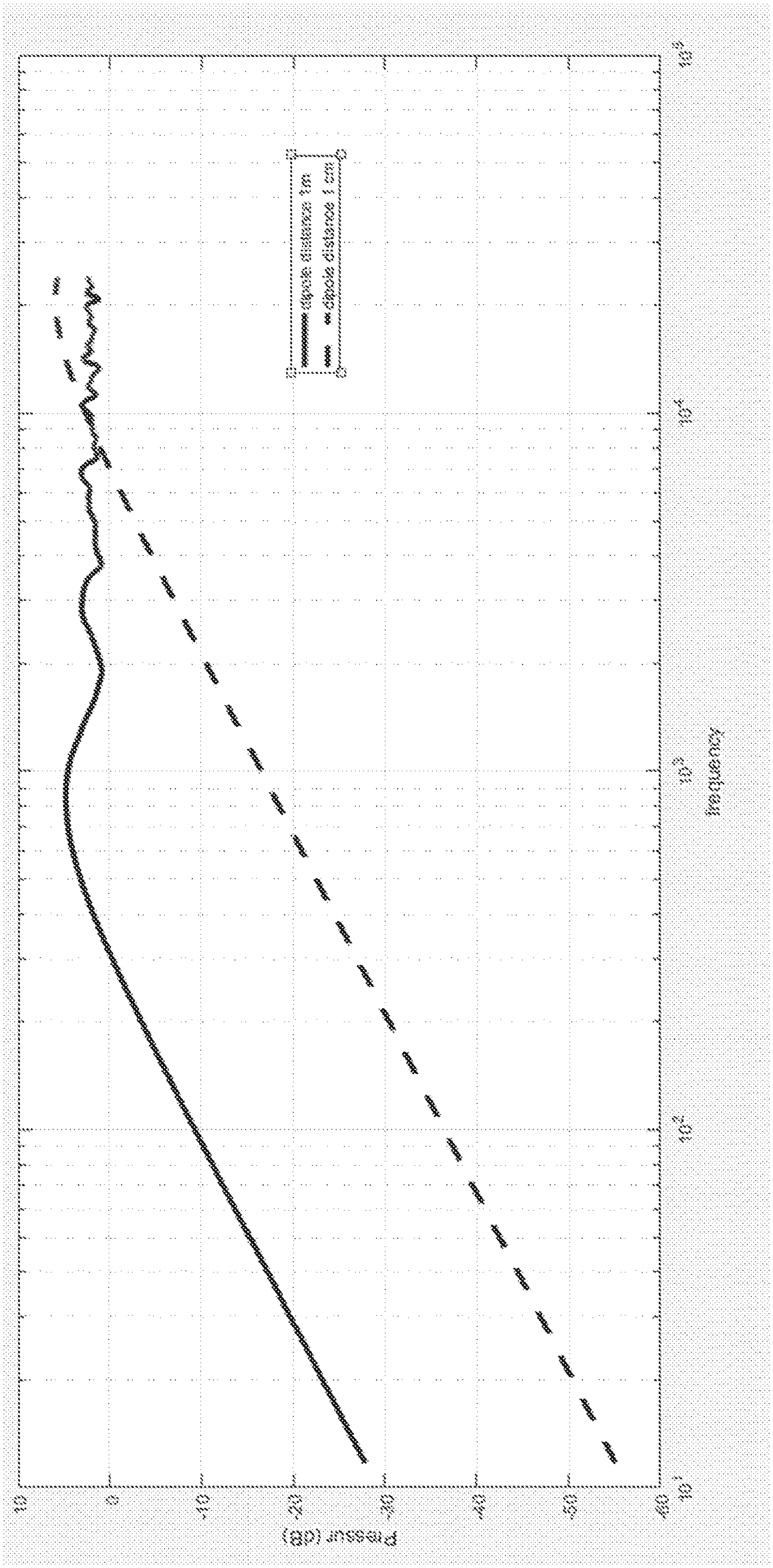
FIG. 3 depicts a diagram indicating the frequency-dependent responses of dipoles having different dipole distances at a given point.

FIG. 2 illustrates a polar diagram indicating a directional dipole response at different frequencies. Ac can be deduced from FIG. 2, the frequency response in the present example is more uniform for 500 Hz than it is for 9200 Hz. FIG. 3 depicts a diagram indicating the frequency-dependent responses of dipoles having different dipole distances at a given point. As further can be deduced from FIG. 3, the intensity of the acoustic dipole depends on both the frequency and the distance of the two monopoles. Generally, these relationships can be summarized as follows: (i) the smaller the distance between the monopoles, the higher the frequency where the directivity of the dipole starts beaming; and (ii) the closer the two monopoles, the higher the cancellation of the signal x(t) at low frequencies, where the interference is destructive. FIG. 3 hereby shows the response of two dipoles having a respective dipole distance of 1 cm and 1 m at a given point. It is evident how the dipole having a dipole distance of 1 cm leads to a low frequency response roll-off.

Embodiments of the present disclosure make use of pairs of dipoles working at different frequencies, e.g., at lower and higher frequencies. Such a system can be referred to as a "2 way" dipole system in that the audio frequency is split into two bands (lower and higher), which may be fed to two reproduction systems, i.e., the two dipoles. The crossover frequency, i.e., the frequency splitting the lower and the higher frequency band, can be obtained on the basis of the frequency response by looking for a compromise between beaming and low frequency cancellation (in FIG. 3 the crossover frequency could be set for example at 4 kHz, where the response of the smaller dipole response rolls-off 6 dB: the term "dipole distance" in FIG. 3 refers to the distance between the two loudspeakers forming the dipole).

Figure 4C:
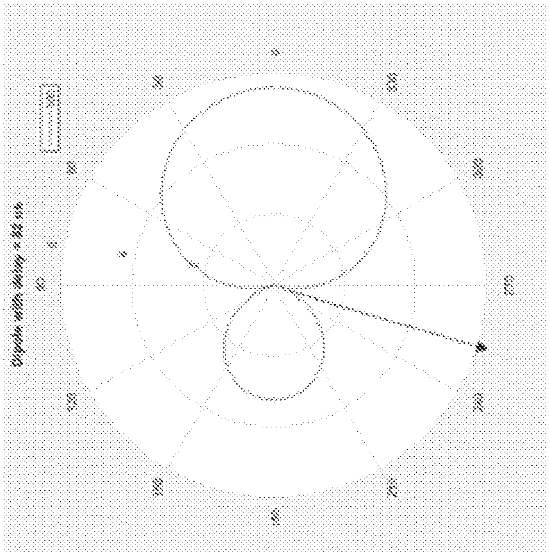
FIGS. 4*a*-*c* illustrate polar diagrams indicating the effect of delay on the directional dipole response based on a given frequency.
Figure 4B:
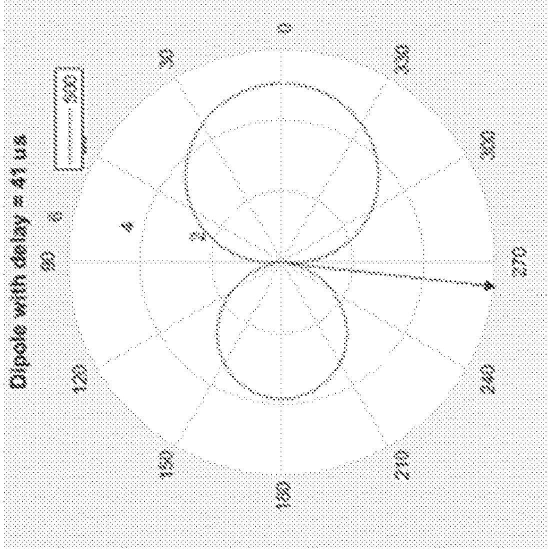
Figure 4A:
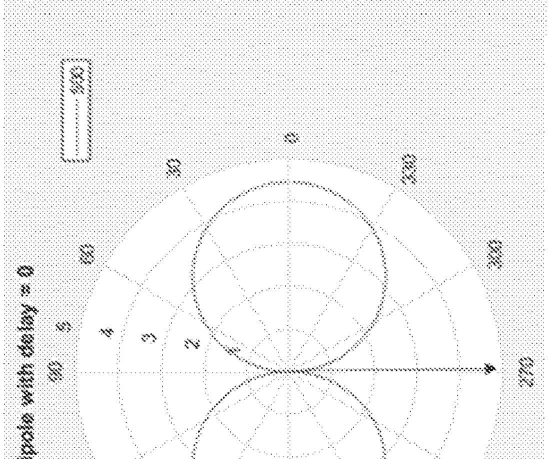

Embodiments of the present disclosure make use of the fact that if a delay D is introduced in the signal feeding one of the two dipoles, i.e., $y_2(t)=-x(t-D)$, the directivity pattern of the dipole changes (as illustrated in the 360 degree depictions according to FIGS. 4*a-c*). More specifically, a delay D may also cause following changes: (i) the lobe related to the delayed monopole is attenuated with respect to the other one (this implies there is less radiation in that direction): (ii) the zero of the dipole moves towards the delayed monopole; and (iii) the main lobe gets wider. According to some embodiment of the present disclosure, the delay D is in the range of $10\ \mu s \geq D \geq 100\ \mu s$.

Embodiments of the present disclosure further make use of a dipole for reproducing binaural signals. Binaural signals are generally recorded (or synthesized using head-related transfer function filters) at the eardrums of a listener, and intended to provide accurate spatial sound when reproduced over headphones. If the two binaural signals are denoted as xL(t) and xR(t), a listener using a headphones may perceive xL(t) at his left ear, while he may perceive xR(t) at his right ear. In doing so, an accurate soundfield may be provided to the listener's eardrums, who has the impression to be present in the location where the recording took place.

Reproducing xL and xR with two loudspeakers (not headphones) worsens this experience, the main reason being the fact that xL and xR are now reaching both ears of the listener (which is not what was happening in the recording stage). The leakage of xL into the right ear and of xR into the left ear is called crosstalk, and is desirable to be avoided.

In order to enhance binaural reproduction over loudspeakers, crosstalk cancellation may be implemented. Using dipoles is one possibility to implement crosstalk cancellation, which will be described in the following in greater detail in the context of FIGS. 5*a* and 5*b*. A first dipole can be created using the following signals:

$$y_1(t)=xL(t)$$

$$y_2(t)=-xL(t-D)$$

This dipole provides having an intensity to be zero or to be at least substantially zero towards the right ear direction of the listener, so that crosstalk cancellation for the left binaural channel 904 may be achieved. Similarly, a second dipole can be created using the following signals:

$$y_1(t)=-xR(t-D)$$

$$y_2(t)=xR(t).$$

Such a dipole enables to transmit an intensity to be zero or to be at least substantially zero towards the left ear direction of the listener, so that crosstalk cancellation for the right binaural channel 905 may be achieved. Hereby, an angle Δγ defined by the left binaural channel 904 and the right binaural channel 905 may be adapted according to a real or designated distance of a listener 1200 relative to the loudspeakers transmitting the dipole.

Figure 6:
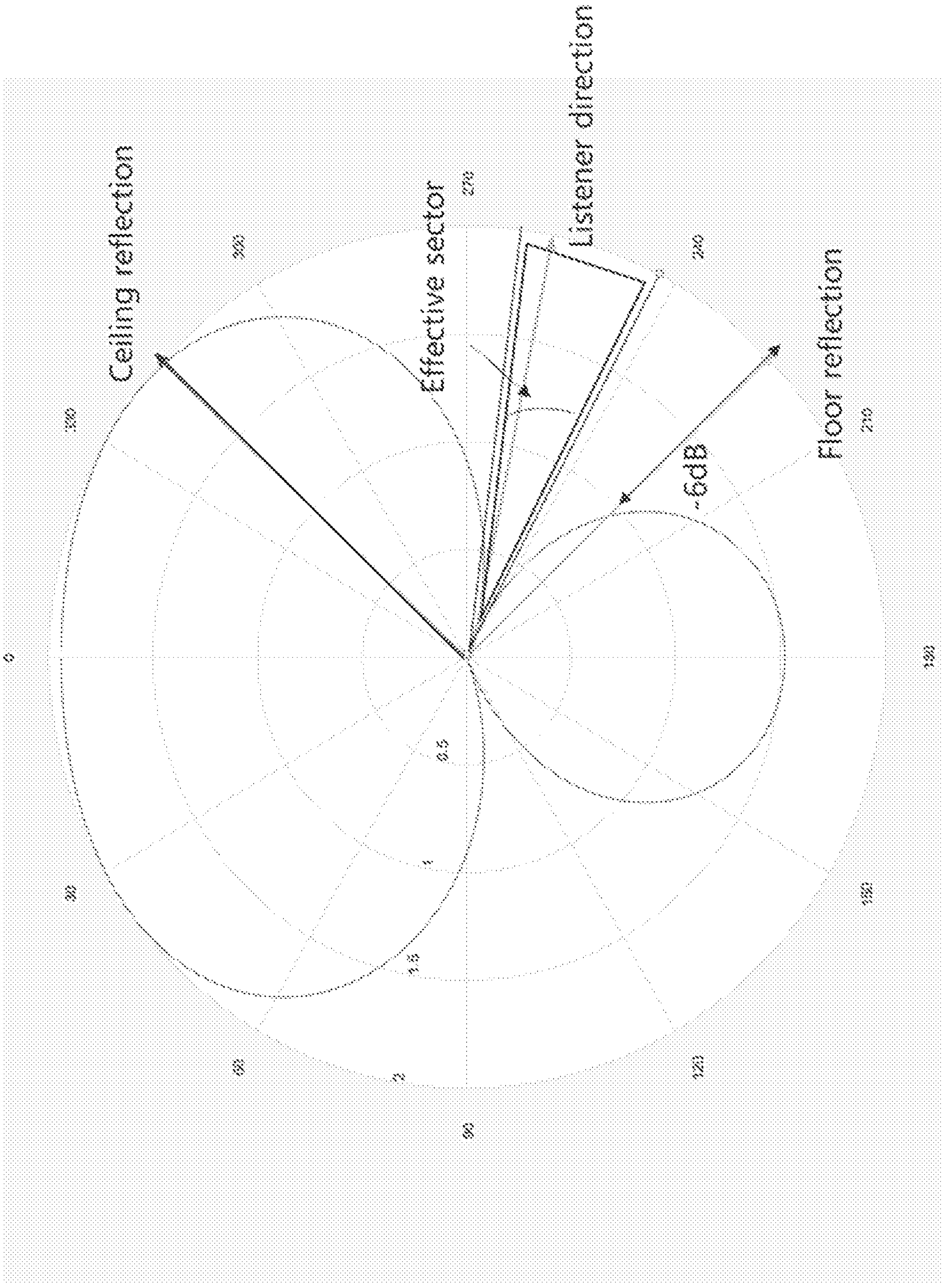
FIG. 6 illustrates a polar diagram indicating the directional response of a dipole configured for sound elevation.

Embodiments of the present disclosure make use of the finding that reflections can be used for simulating virtual sources at an elevated height, i.e., for the purpose of "sound elevation", as e.g., described in U.S. Pat. No. 5,809,150. According to the Haas principle, one requirement that may enable the user to perceive the sound reflection and not the direct sound coming from the source (i.e., the soundbar) is that the reflected sound reaching the user should be at least 10 dB louder than the direct sound. For this purpose, a vertical dipole can be generated and can be used to convey elevated sources content (as illustrated in FIG. 6). Depending on the geometry of the system, a delay D can be controlled in a manner in order to have an intensity to be zero or to be at least in the direction of the listener. Moreover, considering how the downward radiation would provide a reflected field coming from below the listener, the combination of upper and lower reflection would create confusing listening cues, and perception of elevated virtual sources would be blurred.

Applying an exemplary delay D of 82 microseconds on a dipole 10 cm spaced (i.e., the distance between the two loudspeakers forming the dipole is 10 cm), the pattern shown in FIG. 6 is achieved, where the upper lobe represents the pressure sent to the ceiling, the listener direction is the direct sound (which corresponds to the zero of the polar pattern), and the lower lobe is the attenuated pressure sent to the floor. The angular sector represents the vertical robustness of the system, where the direct sound is for example at least 10 dB less than the reflected one. Considering a specular reflection, the sound power reaching the listener after floor reflection is 6 dB less than the one reaching the listener after the reflection at the ceiling.

Figure 7:
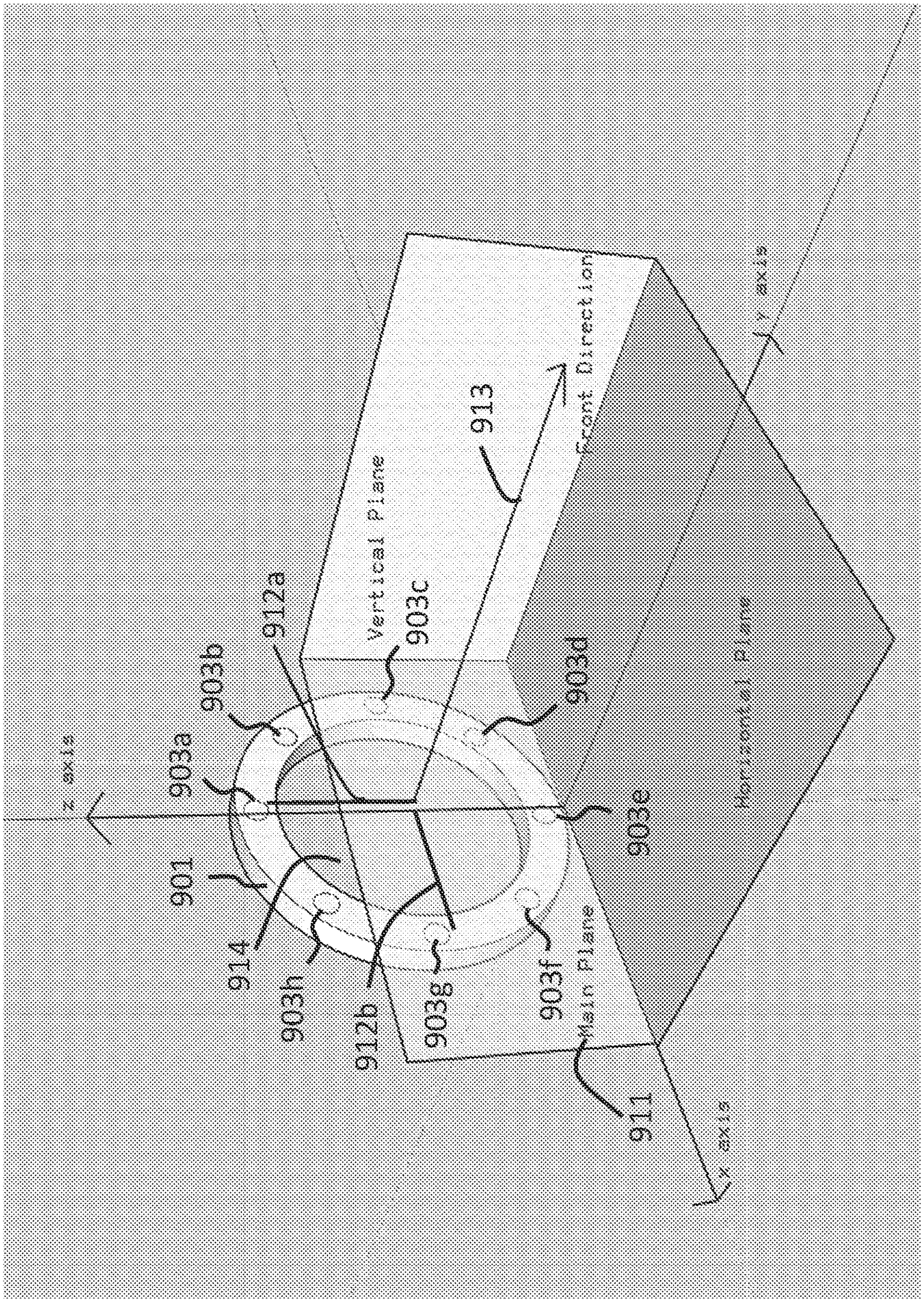
FIG. 7 schematically depicts features implemented in an audio device according to an exemplary embodiment of the present disclosure.

FIG. 7 illustrates features of an audio device 900 for generating a three-dimensional soundfield according to an embodiment of the present disclosure. According to the embodiment depicted in FIG. 7, the housing 901 having an elliptical torus shape is coplanar or at least substantially coplanar. In this case, one may define a main plane 911 spanned by the x axis and the y axis indicated in FIG. 7, which is identical or at least parallel to the coplanar (or at least substantially coplanar) shape of the housing 901, and which may be aligned such that a surface of the housing 901 is within the main plane 911. In particular, the surface of the housing 901 facing to a listener of the soundfield may be within the main plane 911. Hereby, an orientation of the main plane 911 may be characterized by a normal vector 913 oriented perpendicular to the main plane 911. According to some embodiments, the normal vector 913 may be positioned such that the normal vector 913 extends along a symmetry axis of the torus-shaped housing 901.

The audio device 900 comprises a housing 901 having an elliptical shape. According to some embodiments, the elliptical shape of the housing 901 may be a circular shape and a the length of a vertical elliptic axis 912*a* parallel to the z axis and a horizontal elliptic axis 912*b* parallel to the x axis are equal or at least substantially equal. Hereby, the vertical elliptic axis 912*a* and the horizontal elliptic axis 912*b* may be in a range of 3 cm≤912*a*,912*b*≤150 cm. According to some embodiments, the vertical elliptic axis 912*a* and the horizontal elliptic axis 912*b* may be in a range of 5 cm≤912*a*,912*b*≤40 cm. According to some further embodiments, the vertical elliptic axis 912*a* and the horizontal elliptic axis 912*b* may be in a range of 10 cm≤912*a*,912*b*≤20 cm. The opening regime 914 of the circular shape may be used for accommodating a media device, such as a television, smartphone or tablet computer. This means that a curvature in the upper and lower range of the housing 901 is identical or at least substantially identical to a curvature in the left and right range of the housing 901. Such a geometry facilitates to arrange the loudspeakers in a manner, which enables to receive similar dipole distances regarding horizontal dipoles (DH1, DH2, DH3) and vertical dipoles (DV1, DV2, DV3). Therefore, such a geometry may be considered preferable in case that one may achieve similar frequency ranges and frequency range widths in both vertical and horizontal directions.

According to a further embodiment, the elliptical shape of the housing 901 comprises a vertical elliptic axis 912*a* parallel to the z axis and the vertical elliptic axis 912*b* parallel to the x axis, wherein the vertical elliptic axis 912*a* is greater than the horizontal elliptic axis 912*b*. This means that the curvature in the upper and lower range of the housing 901 is greater than the curvature in the left and right range of the housing 901. Such a geometry facilitates to arrange the loudspeakers in a manner, which enables to receive smaller dipole distances regarding horizontal dipoles (DH1, DH2, DH3) compared to vertical dipoles (DV1, DV2, DV3). Accordingly, such a geometry may be considered preferable in case that one may achieve higher frequency ranges in the horizontal direction than in the vertical direction. Further, such a geometry facilitates to arrange the loudspeakers in a manner, which enables to receive a smaller variance in dipole distances in between horizontal dipoles (DH1, DH2, Dh3) compared to vertical dipoles (DV1, DV2, DV3). Accordingly, such a geometry may be considered preferable in case that one may achieve greater frequency range widths in the vertical direction than in the horizontal direction.

According to a further embodiment, the elliptical shape of the housing 901 comprises a vertical elliptic axis 912*a* parallel to the z axis and the horizontal elliptic axis 912*b* parallel to the x axis, wherein the vertical elliptic axis 912*a* is smaller than the horizontal elliptic axis 912*b*. This means that the curvature in the upper and lower range of the housing 901 is smaller than the curvature in the left and right range of the housing 901. Such a geometry facilitates to arrange the loudspeakers in a manner, which enables to receive greater dipole distances regarding horizontal dipoles (DH1, DH2, DH3) compared to vertical dipoles (DV1, DV2, DV3). Accordingly, such a geometry may be considered preferable in case that one may achieve lower frequency ranges in the horizontal direction than in the vertical direction. Further, such a geometry facilitates to arrange the loudspeakers in a manner, which enables to receive a higher variance in dipole distances in between horizontal dipoles (DH1, DH2, DH3) compared to vertical dipoles (DV1, DV2, DV3).

The cross sections of the torus shaped housings may in general have any shape. The cross-sections may for example be (at least substantially) circular or elliptical cross sections, square, rectangular, hexagonal or octagonal cross sections.

According to FIG. 7, the housing 901 may comprise openings in which the loudspeakers 901*a*-901*h* may be accommodated. Such a configuration may achieve a preferably compact packaging of the audio device. However, according to further implementations, at least some of the loudspeakers 903*a*-903*h* are mounted onto the coplanar surface of the housing 91 facing the listener of the soundfield. According to further implementations, at least some of the loudspeakers 903*a*-903*h* are mounted outside along the periphery of the elliptical torus shape.

The audio device 900 may further comprise a processing circuitry 1310 configured to process a plurality of input signals to obtain a plurality of output signals output to the plurality of loudspeakers. The processing circuitry 1310 may, for example, be configured to process a plurality of input signals L, R, UL, UR to obtain a plurality of output signals LCH HF/2, RCH HF/2, LCH MF, RCH MF, UL HF, UR HF, UL MF, UR MF and output the plurality of output signals LCH HF/2, RCH HF/2, LCH MF, RCH MF, UL HF, UR HF, UL MF, UR MF to the plurality of loudspeakers 903*a*-903*h*. In order to simplify visualization, however, the processing circuitry has not been depicted in FIG. 7. According to some embodiments, the processing circuitry 1310 of the audio device 900 may be based on any of the configurations depicted in FIGS. 10*a*-10*b*, 12*a*-12*b* and 15. The processing circuitry 1310 of the audio device 900 may comprise hardware and/or software. The hardware may comprise digital circuitry, or both analogue and digital circuitry. Digital circuitry may comprise components such as application-specific integrated circuits (ASICs), field-programmable arrays (FPGAs), digital signal processors (DSPs), or general-purpose processors, e.g., software programmable processors. In one embodiment, the processing circuitry 1310 comprises one or more processors and a non-transitory memory connected to the one or more processors. The non-transitory memory may carry executable program code which, when executed by the one or more processors, causes the audio device 900 to perform the operations or methods described herein.

Figure 8:
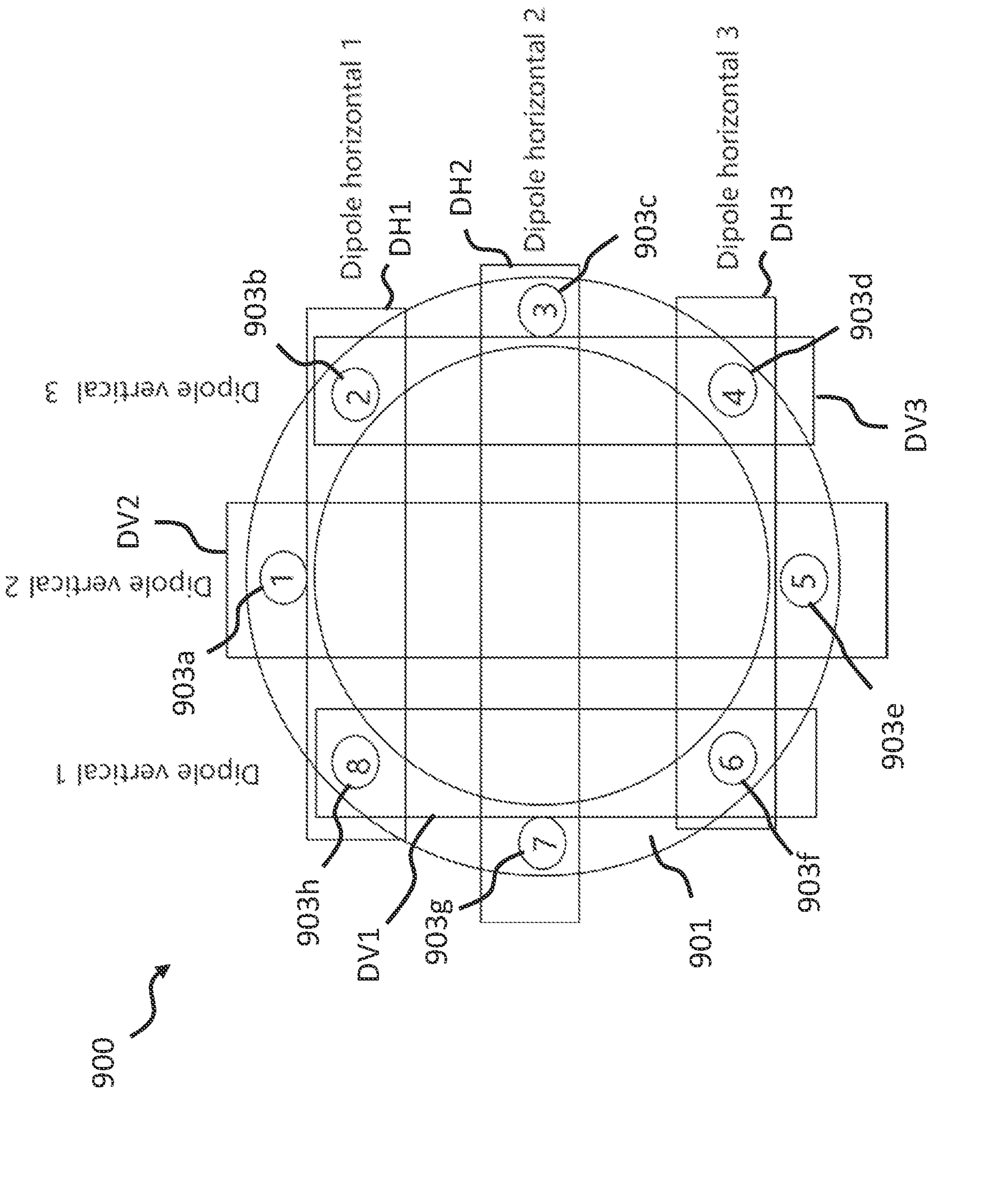
FIGS. 8 and 8*a* schematically depict an audio device according to an exemplary embodiment of the present disclosure implementing a plurality of horizontal dipoles for crosstalk cancellation and a plurality of vertical dipoles for sound elevation.

FIG. 8 schematically depicts an audio device 900 according to an exemplary embodiment of the present disclosure implementing a plurality of horizontal dipoles DH1-DH3 for crosstalk cancellation and a plurality of vertical dipoles DV1-DV3 for sound elevation 1204*a*, 1204*b*. According to some embodiments, the processing circuitry 1310 of the audio device 900 according to FIG. 8 (not depicted in FIG. 8) may be based on any of the configurations depicted in FIGS. 10*a*-10*b*, 12*a*-12*b* and 15. According to some embodiments, the processing circuitry 1310 of the audio device 900 may configured to process the plurality of input signals L, R, UL, UR (L represents input signals input by a left channel, R represents input signals input by a right channel signal, UL represents the vertical left hand side signal components and UR represents the vertical right hand side signal components) such that, for example, the loudspeakers 903*b* and 903*h*, represent a first pair of the plurality of loudspeakers 903*a*-903*h*, which form a first dipole, namely a horizontal dipole (referred to as dipole horizontal 1 or short "DH1" in FIG. 8) for crosstalk cancellation between left hand side signal components 904 and right hand side signal components 905 in a first frequency range of the soundfield (based on the principles described above in the context of FIGS. 4*a*, 4*b* and 5).

Moreover, the processing circuitry 1310 of the audio device 900 may be configured to process the plurality of input signals L, R, UL, UR such that the loudspeakers 903*c* and 903*g* as a second pair of the plurality of loudspeakers 903*a*-903*h* form a second dipole, namely a further horizontal dipole (referred to as dipole horizontal 2 or short "DH2" in FIG. 8) for crosstalk cancellation between left hand side signal components 904 and right hand side signal components 905 in a second frequency range of the soundfield (based on the principles described above in the context of FIGS. 4*a*, 4*b* and 5). The first frequency range extends to higher frequencies than the second frequency range. In an embodiment, the first frequency range comprises a high frequency (HF) range and/or the second frequency range comprises a medium frequency (MF) range. According to some implementations, the MF range may be within a range of $10^2$ Hz≤MF≤$10^4$ Hz and/or the HF range may be above $10^3$ Hz. According to some embodiments, the first frequency range and the second frequency range may have an overlapping range. According to further embodiments, the first frequency range and the second frequency range may be separate from each other, i.e., do not overlap.

As illustrated in FIG. 8, by means of selecting a circular shape of the housing 901 and an equally or at least substantially equally space arrangement of the plurality of loudspeakers 903*a*-903*h* within the housing 901, the distance between the loudspeakers 903*b* and 903*h* forming the horizontal dipole DH1 may be smaller than the distance between the loudspeakers 903*c* and 903*g* forming the horizontal dipole DH2.

Moreover, the processing circuitry 1310 of the audio device 900 may be configured to process the plurality of input signals L, R, UL, UR such that the loudspeakers 903*f* and 903*h* as a third pair of the plurality of loudspeakers 903*a*-903*h* form a third dipole, namely a vertical dipole (referred to as dipole vertical 1 or short "DV1") for sound elevation 1204*a*, 1204*b* of the soundfield (based on the principles described above in the context of FIG. 6). In this case, loudspeaker 903*h* may be used for two different acoustic dipoles, namely dipoles DH1 and DV1. Thereby, the number of required loudspeakers for achieving the three-dimensional soundfield may be reduced. Thereby, compactness of device packaging may be improved. Further, cost saving for the audio device production may be enabled.

According to a further embodiment, the processing circuitry 1310 may also be configured to process the plurality of input signals L, R, UL, UR such that the loudspeakers 903*b* and 903*d* as a sixth pair of the plurality of loudspeakers 903*a*-903*h* form a sixth dipole, namely a vertical dipole (referred to as dipole vertical 3 or short "DV3") for sound elevation 1204*a*, 1204*b* of the soundfield. In this case, loudspeaker 903*b* may be used for two different acoustic dipoles, namely dipoles DH1 and DV3. Thereby, the number of required loudspeakers for achieving the three-dimensional soundfield may be reduced. This may improve compactness of device packaging and may further enable cost saving for the audio device production.

According to a further embodiment, the processing circuitry 1310 may also be configured to process the plurality of input signals L. R, UL, UR such that the loudspeakers 903*a* and 903*e*, i.e., a fifth pair of the plurality of loudspeakers 903*a*-903*h* form a fifth dipole, namely a vertical dipole (referred to as dipole vertical 2 or short "DV2") for sound elevation 1204*a*, 1204*b* of the soundfield. In this case, none of the loudspeakers will be used for two different acoustic dipoles.

As further illustrated in the embodiment shown in FIG. 8, the processing circuitry 1310 of the audio device 900 may also be configured to process the plurality of input signals L. R, UL, UR such that the loudspeakers 903*d* and 903*f*, i.e., a fourth pair of the plurality of loudspeakers 903*a*-903*h* form a fourth dipole (referred to as dipole horizontal 3 or short "DH3" in FIG. 8) for crosstalk cancellation between left hand side signal components 904 and right hand side signal components 905 in the first frequency range or a different frequency range of the soundfield (based on the principles described above in the context of FIGS. 4*a*, 4*b* and 7). As illustrated in FIG. 8, according to an embodiment, the first dipole DH1 and the fourth dipole DH3 may have the same dipole distance. In doing so, the intensity of the soundfield in the respective frequency range may be improved. In particular, this may be beneficial in case of having small loudspeakers, whose intensity is limited due to their small size. Another reason for doing so may be seen in that in this case, the power of the respective individual loudspeakers may be reduced, which may increase durability of each of the respective individual loudspeakers.

According to some embodiments, at least some or all of the dipole distances (DD) may be in the range of 5 cm≤DD≤30 cm. According to some embodiments, at least one of the DD of the horizontal dipoles DH1-DH3 is equal or at least substantially equal with one of the DD of the vertical dipoles DV1-DV3. According to some embodiments, the DD of DH1, DH3, DV1 and DV3 may be equal or at least substantially equal. According to some embodiments, the DD of DH2 and DV2 may be equal or at least substantially equal.

Figure 8A:
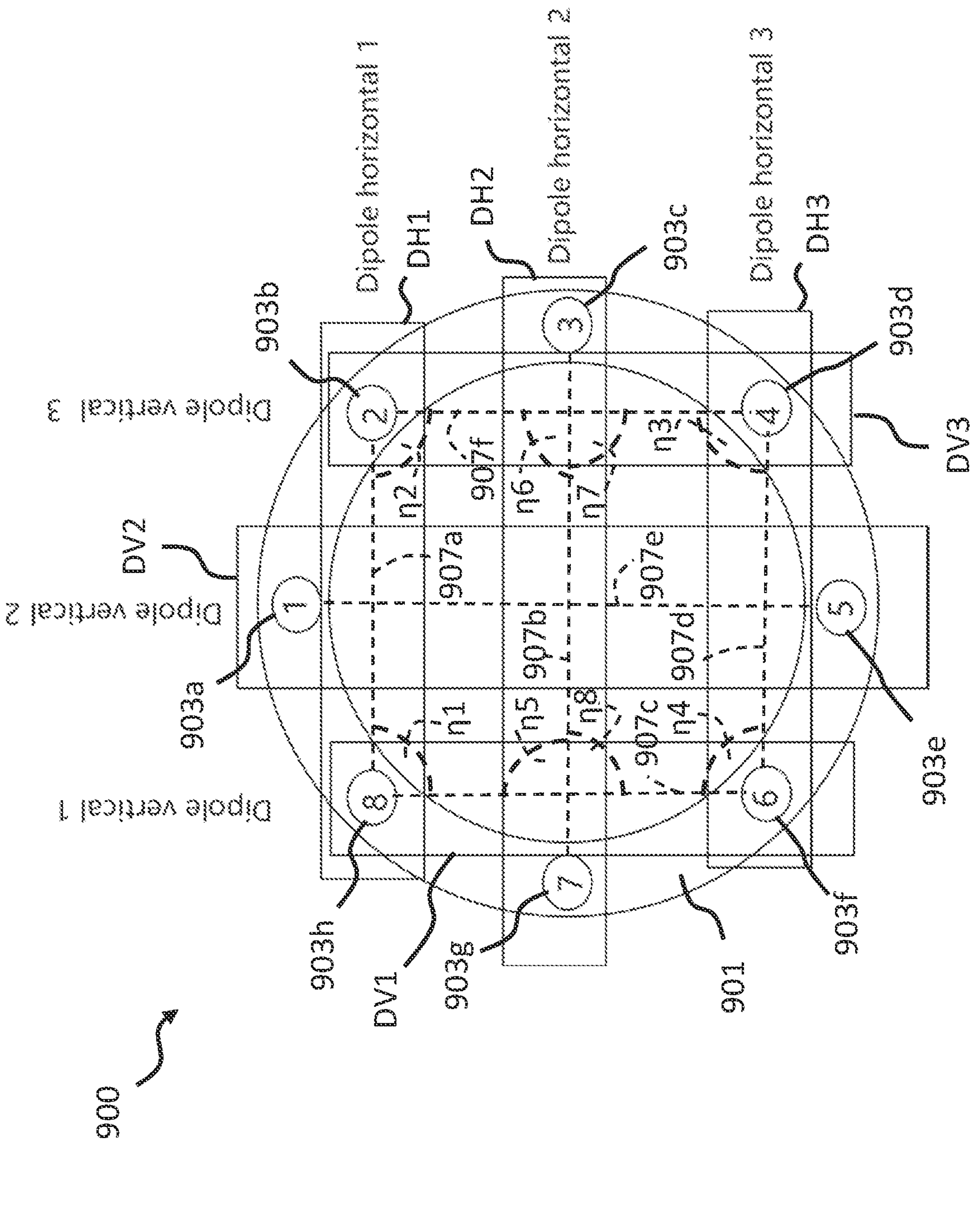

As can be further deduced from FIG. 8*a* (which shows the same embodiment as FIG. 8 but additionally also dipole orientations and angles between different dipole orientations), the first dipole DH1 may have a first dipole orientation 907*a*, the second dipole DH2 may have a second dipole orientation 907*b*, the third dipole DV1 may have a third dipole orientation 907*c*, the fourth dipole DH3 may have a fourth dipole orientation 907*d*, the fifth dipole DV2 may have a fifth dipole orientation 907*e* and the sixth dipole DV3 may have a sixth dipole orientation 907*f*. Hereby, a first dipole orientation angle η1 may be defined by the first dipole orientation 907*a* relative to the third dipole orientation 907*c*, a second dipole orientation angle η2 may be defined by the sixth dipole orientation 907*f* relative to the first dipole orientation 907*a*, a third dipole orientation angle η3 may be defined by the fourth dipole orientation 907*d* relative to the sixth dipole orientation 907*f*, a fourth dipole orientation angle η4 may be defined by the third dipole orientation 907*c* relative to the fourth dipole orientation 907*d*, a fifth dipole orientation angle η4 may be defined by the third dipole orientation 907*c* relative to the second dipole orientation 907*b*, a sixth dipole orientation angle η6 may be defined by the third dipole orientation 907*c* relative to the second dipole orientation 907*b*, a seventh dipole orientation angle η7 may be defined by the sixth dipole orientation 907*f* relative to the second dipole orientation 907*b* and an eighth dipole orientation angle 18 may be defined by the third dipole orientation 907*c* relative to the second dipole orientation 907*b*.

According to some embodiments, at least one or several or even all of the dipole orientation angles η1-η8 may be in a range of 65°≤$\eta_i$≤115°. According to some embodiments at least one or several or even all of the dipole orientation angles η1-η8 may be in a range of 75°≤$\eta_i$≤105°. According to some embodiments at least one or several or even all of the dipole orientation angles η1-η8 may be in a range of 85°≤$\eta_i$≤95°. According to some embodiments, the first, second and fourth dipole orientations 907*a*, 907*b*, 907*d* corresponding to dipoles DH1-DH3 are identical or at least substantially identical. According to some embodiments, the third, fifth and sixth dipole orientations 907*c*, 907*e*, 907*f* corresponding to dipoles DV1-DV3 are identical or at least substantially identical. According to some embodiments, first, second and fourth dipole orientations 907*a*, 907*b*, 907*d* corresponding to dipoles DH1-DH3 are perpendicular or at least substantially perpendicular to third, fifth and sixth dipole orientations 907*c*, 907*e*, 907*f* corresponding to dipoles DV1-DV3.

Additionally or alternatively to the horizontal dipoles DH1-D3 and the vertical dipoles DV1-DV3 depicted in FIG. 8*a*, the audio device 900 may comprise further substantially horizontal dipoles (not depicted in FIG. 8*a*). As an example, the loudspeakers 903*h* and 903*a* may form a further substantially horizontal dipole. The loudspeakers 903*a* and 903*b* may also form a further substantially horizontal dipole. The loudspeakers 903*f* and 903*e* may also form a further substantially horizontal dipole. The loudspeakers 903*e* and 903*d* may also form a further substantially horizontal dipole. As can be deduced from the configuration of FIG. 8*a*, these further substantially horizontal dipoles comprise dipole distances smaller than dipoles DH1-DH3 and DV1-DV3 from FIG. 8*a*, resulting in further dipole frequencies exceeding the first (HF) and second (MF) frequency ranges.

Additionally or alternatively, the audio device 900 may comprise further substantially vertical dipoles (not depicted in FIG. 8*a*). As an example, the loudspeakers 903*h* and 903*g* may form a further substantially vertical dipole. The loudspeakers 903*g* and 903*f* may form a further substantially vertical dipole. The loudspeakers 903*b* and 903*c* may form a further substantially vertical dipole. The loudspeakers 903*c* and 903*d* may form a further substantially vertical dipole. As can be deduced from the configuration of FIG. 8*a*, these further substantially vertical dipoles comprise dipole distances smaller than dipoles DH1-DH3 and DV1-DV3 from FIG. 8*a*, resulting in further dipole frequencies exceeding the first (HF) and second (MF) frequency ranges.

Additionally or alternatively, the audio device 900 may comprise further substantially vertical dipoles (not depicted in FIG. 8*a*). As an example, the loudspeakers 903*a* and 903*f* may form a further substantially vertical dipole. The loudspeakers 903*a* and 903*d* may form a further substantially vertical dipole. The loudspeakers 903*h* and 903*e* may form a further substantially vertical dipole. The loudspeakers 903*b* and 903*e* may form a further substantially vertical dipole. As can be deduced from the configuration of FIG. 8*a*, these further substantially vertical dipoles comprise dipole distances similar to dipoles DH2 and DV2 from FIG. 8*a*, resulting in further dipole frequencies similar to the second (MF) frequency range.

Alternatively to the configuration of FIG. 8*a*, the audio device 900 may also comprise a reduced number of loudspeakers 903*a*-903*h* (not depicted). As an example, the device 900 may merely comprise loudspeakers 903*b*, 903*c*, 903*g* and 903*h*. In this case, the audio device comprises a first horizontal dipole DH1 based on loudspeakers 903*b* and 903*h* and a second horizontal dipole DH2 based on loudspeakers 903*c* and 903*g*. Additionally, this configuration comprises a first substantially vertical dipole DV1' based on loudspeakers 903*g* and 903*h* and a second substantially vertical dipole DV3' based on loudspeakers 903*b* and 903*c*. Such a configuration substantially enables to maintain the improved three-dimensional sound experience of the configuration of FIGS. 8 and 8*a*, while at the same time achieves space-saving in the audio device 900 that may, e.g., be used for accommodating further electronic components.

Moreover, as illustrated in the embodiment shown in FIG. 8, the processing circuitry 1310 of the audio device 900 may be further configured to process the plurality of input signals L. R. UL. UR such that the loudspeakers 903*a* and 903*e* as a fifth pair of the plurality of loudspeakers 903*a*-903*h* form a fifth dipole (referred to as dipole vertical 2 or short "DV2") for sound elevation 1204*a*. 1204*b* of the soundfield and such that the loudspeakers 903*b* and 903*d* as a sixth pair of the plurality of loudspeakers 903*a*-903*h* form a sixth dipole (referred to as dipole vertical 3 or short "DV3") for sound elevation 1204*a*, 1204*b* of the soundfield (based on the principles described above in the context of FIG. 6). As illustrated in FIG. 8, according to an embodiment, the third dipole DV1 and the sixth dipole DV3 may have the same dipole distance. In doing so, the intensity of the soundfield in the respective frequency range may be improved. Alternatively, the power of the respective individual loudspeakers may be reduced, which may increase durability of each of the respective individual loudspeakers. Hereby, the dipole distance of DV1 and DV3 may be smaller than the dipole distance of DV2.

As can be taken from the embodiment shown in FIG. 8, the processing circuitry 1310 of the audio device 900 may be configured to operate at least one of the plurality of loudspeakers 903*a*-903*h* as a component of both a horizontal dipole and a vertical dipole. For instance, in the embodiment shown in FIG. 8, the loudspeaker 903*b* is operated by the processing circuitry 1310 of the audio device 900 as a component of both the first dipole DH1 and the sixth dipole DV3, the loudspeaker 903*d* is operated as a component of both the fourth dipole DH3 and the sixth dipole DV3, the loudspeaker 903*f* is operated as a component of both the fourth dipole DH3 and the third dipole DV1 and the loudspeaker 903*h* is operated as a component of both the first dipole DH1 and the third dipole DV1. Therefore, based on the configuration according to FIG. 8, six dipole outputs (DH1, DH2, DH3, DV1, DV2, DV3) may be achieved based on merely eight loudspeakers 903*a*-903*h*.

Although the embodiment shown in FIG. 8 comprises three horizontal dipoles DH1, DH2 and DH3 for crosstalk cancellation and three vertical dipoles DV1, DV2 and DV3 for sound elevation 1204*a*, 1204*b*, the person skilled in the art will appreciate that the audio device 900 can be implemented using more or less than the three horizontal and/or vertical dipoles shown in FIG. 8.

In addition, although the embodiment shown in FIG. 8 comprises equally spaced loudspeakers 903*a*-903*h*, one may deduce that non-equally spaced loudspeakers 903*a*-903*h* may be provided according to other embodiments of the present disclosure. In particular, a non-equally spaced loudspeakers 903*a*-903*h* may enable to have a soundfield having high intensity in a frequency range.

According to further embodiments, the audio device 900 may be configured to reproduce multichannel content which involves elevated sources similar to the multichannel audio format 7.1.2. In an embodiment, the audio device 900 may be configured to handle the following channels-based input of the multichannel audio format 7.1.2 as follows: the horizontal input signals L. R. C, SL, SR, SBL, SBR (C represents an input signal input by a centered channel, SL represents an input signals input by the surround or front left channel, SR represents an input signal input by the surround or front right channel, SBL represents in input signal input by the surround back or rear left channel and SBR represents an input signal input by the surround back or rear right channel); and the vertical left and right hand signal components: UL, UR. According to some implementations, there may also be a reduced number of horizontal input signals. As an example, the horizontal input signals may also be restricted to L and R.

Figure 9:
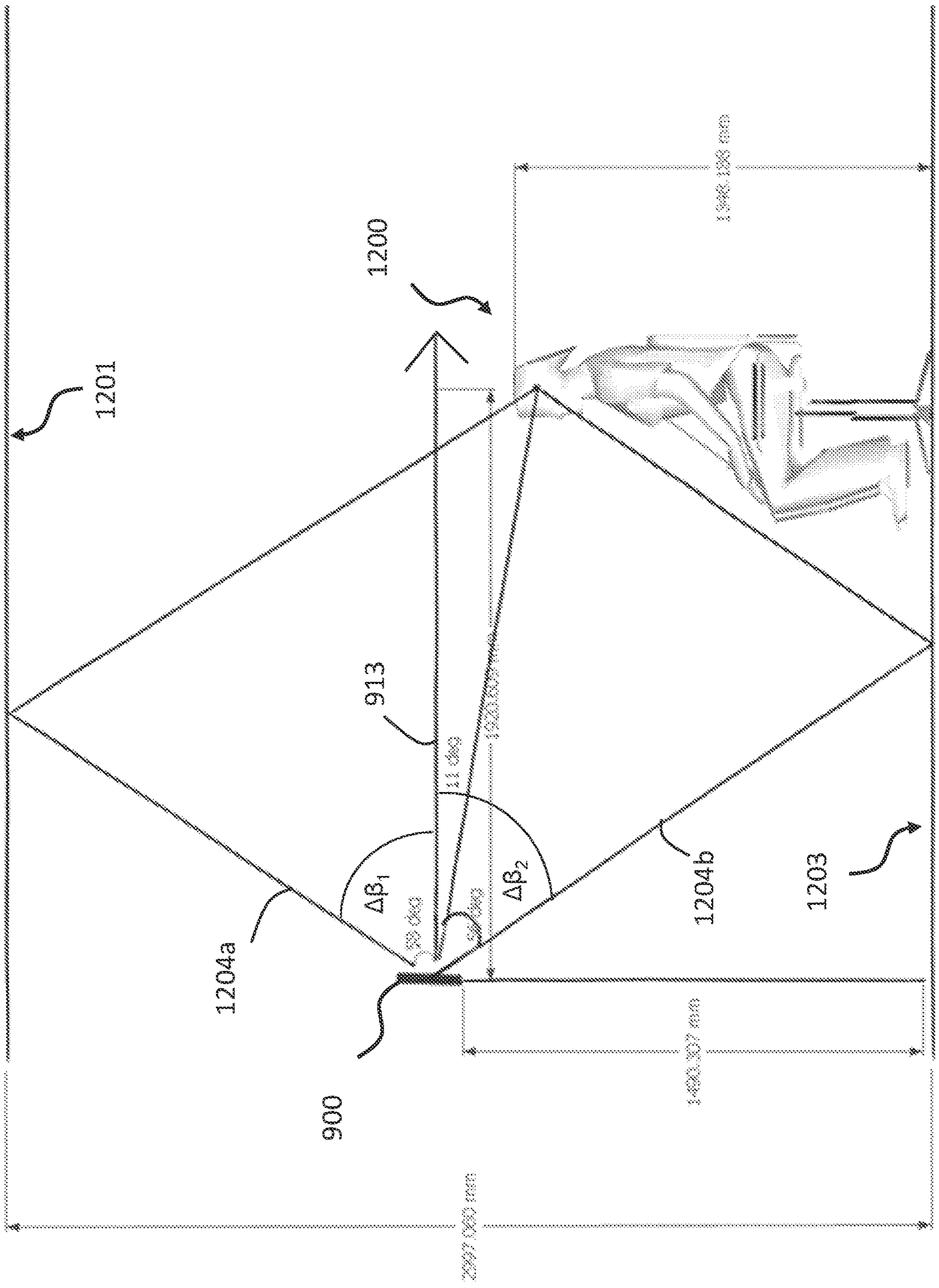
FIG. 9 schematically illustrates sound emission within a room based on the audio device according to an exemplary embodiment of the present disclosure.

FIG. 9 illustrates an exemplary arrangement of the audio device 900 according to an exemplary embodiment of the disclosure within a room having a ceiling 1201 and a floor 1203 relative to a listener 1200. Hereby, the listener 1200 may receive cross cancellation portions of the soundfield from at least the first dipole DH1 and the second dipole DH2. Further, the listener 1200 may receive elevation portions 1204*a*, 1204*b* of the soundfield from at least the third dipole DV1. According to some embodiments, the listener 1200 may receive cross cancellation portions of the soundfield from dipoles DH1-DH3. According to some further embodiments, the listener 1200 may receive elevation portions 1204*a*, 1204*b* of the soundfield from dipoles DV1-DV3. Hereby, angles $\Delta\beta_1$ and $\Delta\beta_2$, respectively defined by a normal vector 913 of a main plane defined by the elliptical torus shape of the housing and the propagation direction of the sound elevation portion of the soundfield may be in a range of $0°\leq\Delta\Delta_1\leq75°$ and $0°\leq\Delta\beta_2\leq75°$, wherein the propagation direction of the sound elevation portion of $\Delta\beta_1$ may be directed upwards and the propagation direction of the sound elevation portion of $\Delta\beta_2$ may be directed downwards. In certain embodiments, angles $\Delta\beta_1$ and $\Delta\beta_2$ may be in a range of $20°\leq\Delta\beta_1\leq65°$ and $20°\leq\Delta\beta_2\leq65°$. In certain embodiments, angles $\Delta\beta_1$ and $\Delta\beta_2$ may be in a range of $40°\leq\Delta\beta_1\leq55°$ and $40°\leq\Delta\beta_2\leq55°$. In certain embodiments, angles $\Delta\beta_1$ and $\Delta\beta_2$ may be in a range of $45°\leq\Delta\beta_1\leq50°$ and $45°\leq\Delta\beta_2\leq50°$.

Figure 10A:
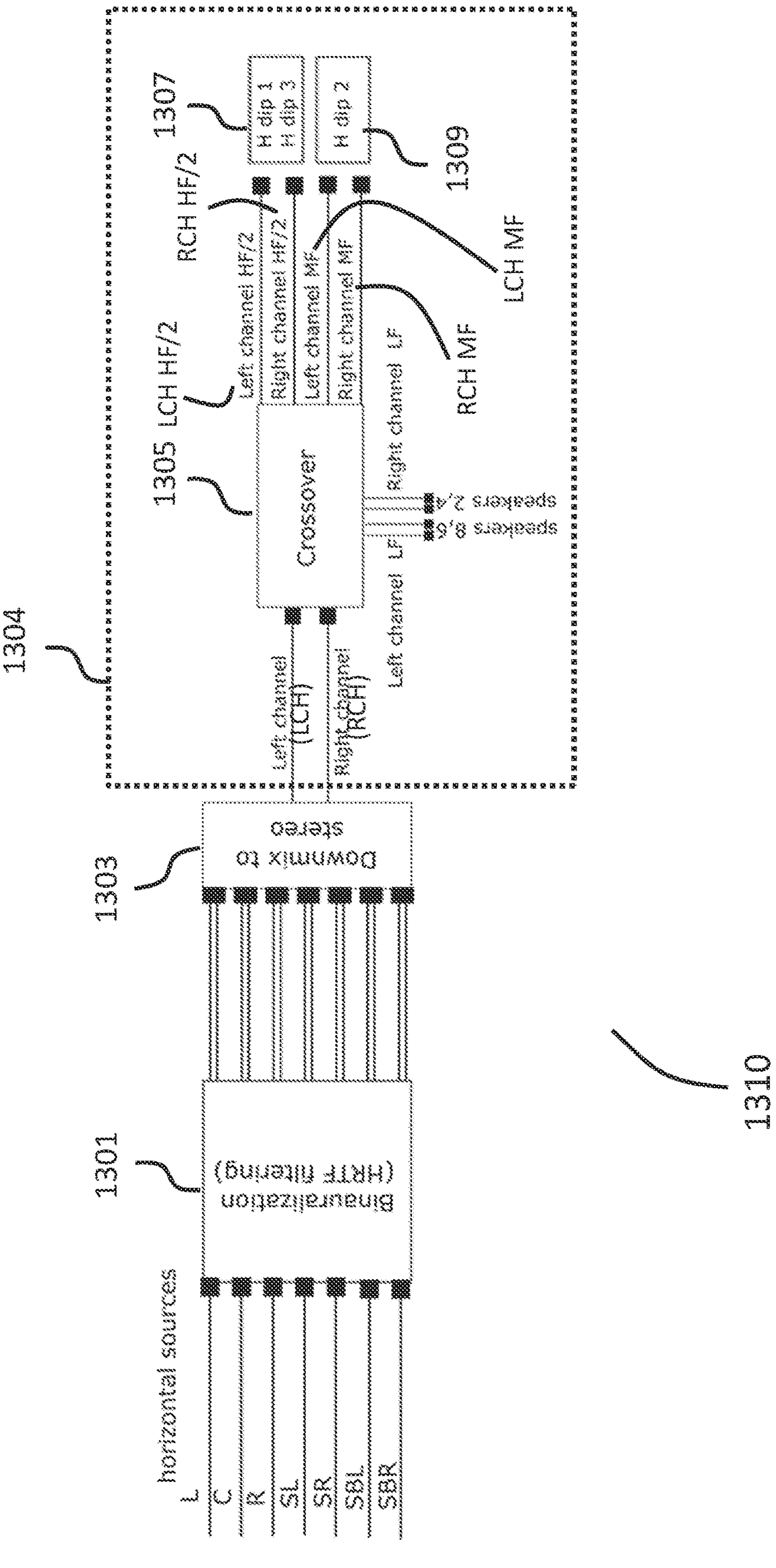
FIGS. 10*a* and *b* schematically illustrate horizontal processing portions of a processing circuitry of an audio device according to an exemplary embodiment.
Figure 10B:
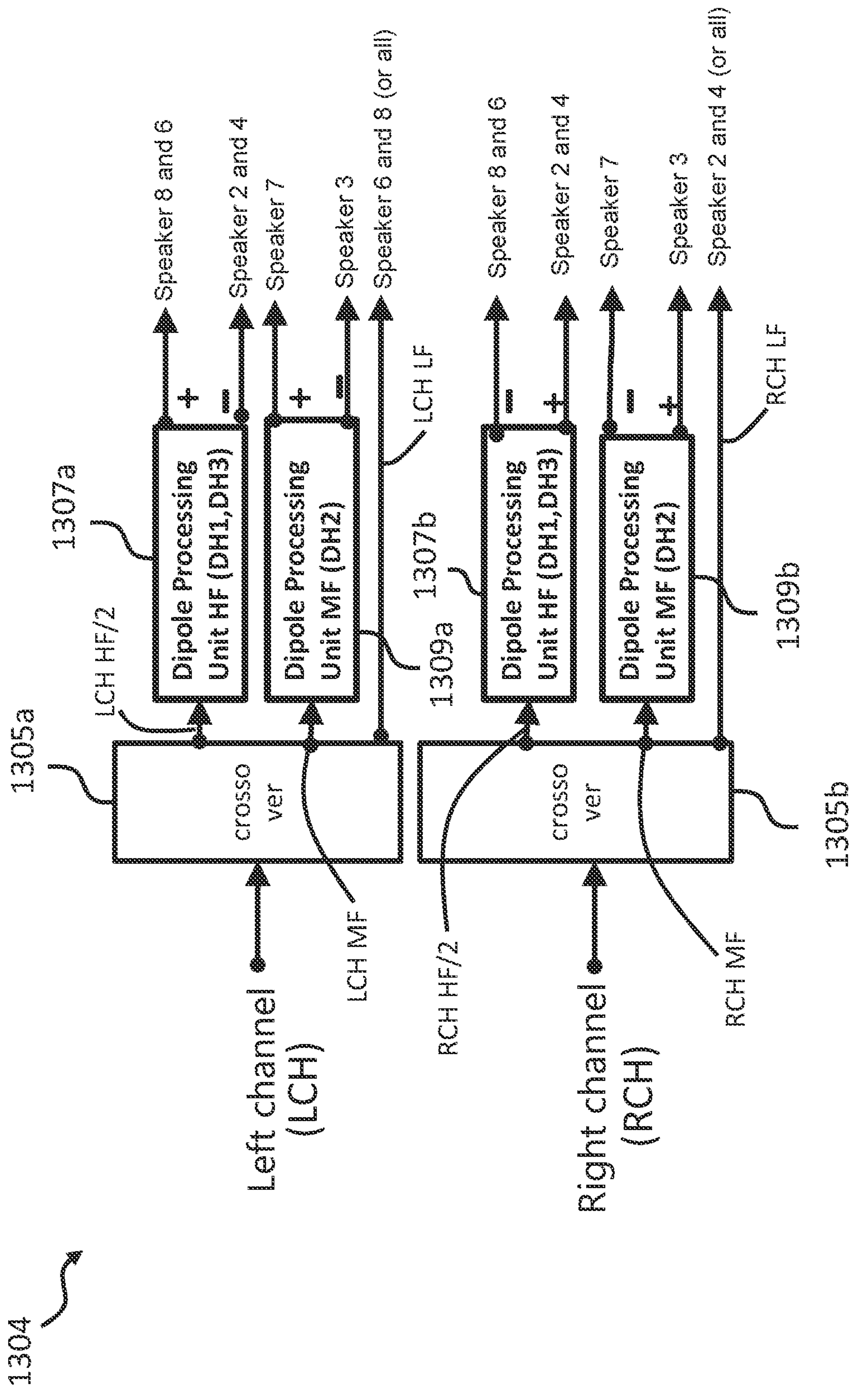

FIGS. 10*a* and 10*b* schematically illustrate horizontal processing portions of a processing circuitry 1310 of an audio device 900 according to an exemplary embodiment. According to FIG. 10*a*, processing of the plurality of horizontal input signals L, C, R, SL, SR, SBL, SBR and obtaining the output signals for the horizontal dipoles DH1, DH2 and DH3 is depicted. In the embodiment shown in FIGS. 10*a* and 10*b*, the output signals for the horizontal dipoles DH1, DH2 and DH3 may be generated by the processing circuitry 1310 of the audio device 900 on the basis of multichannel input signal according to the audio format 7.1.2, namely the L, R, C, SL, SR, SBL, SBR input signals.

In a first processing stage, these horizontal signals may be "binauralized", i.e., convolved with binaural filters (Head Related Transfer Functions) in order to obtain binaural signals corresponding to the horizontal loudspeakers 903*a*-903*h* in the 7.1.2 setup (see "binauralization" block 1301 in FIG. 10*a*). Afterwards, the seven stereo signals may be summed together to form a stereo downmix (see "downmixing" block 1303 in FIG. 10*a*). Thereafter, the resulting first or left channel signal LCH and second or right channel signal RCH can be "bandpass"-filtered using a crossover block 1304, for instance, low-pass, band-pass and high-pass filtered in order to obtain for each of both a horizontal three way stereo signal (LH, MH, HH: where "LF" stands for Low Frequency, "MF" stands for Mid-Frequency, "HF" stands for High-Frequency). According to an embodiment, the low passed version LH may be obtained using a low pass filter with a cutoff frequency $f_L$, the band pass filter may provide a bandpassed version MH between the frequencies $f_L$ and $f_M$, while the high frequency part or portion HF may be obtained using a high-pass filter with a cutoff frequency $f_H$. According to an embodiment, these different frequencies associated with the downmixing block 1303 may be determined on the basis of the exemplary configuration of the audio device 900 and its use case. For instance, a suitable lower cutoff frequency $f_L$ can be determined on the basis of the electroacoustic properties of the audio device 900, such as the type of loudspeakers 903*a*-903*h*, amplifiers and the like. A suitable frequency $f_M$ can be obtained by analysing the frequency response of the first and second horizontal dipoles DH1 and DH2 and by determining a compromise between beaming and low frequency cancellation (as already described above in the context of FIG. 3). For example, in an embodiment with the housing 901 of the audio device 900 having a diameter of 21 cm, a dipole distance of the first and third horizontal dipole DH1, DH3 of 11 cm and a dipole distance of the second horizontal dipole DH2 of 20 cm the frequency $f_M$ can be about 900 Hz.

Figure 5B:
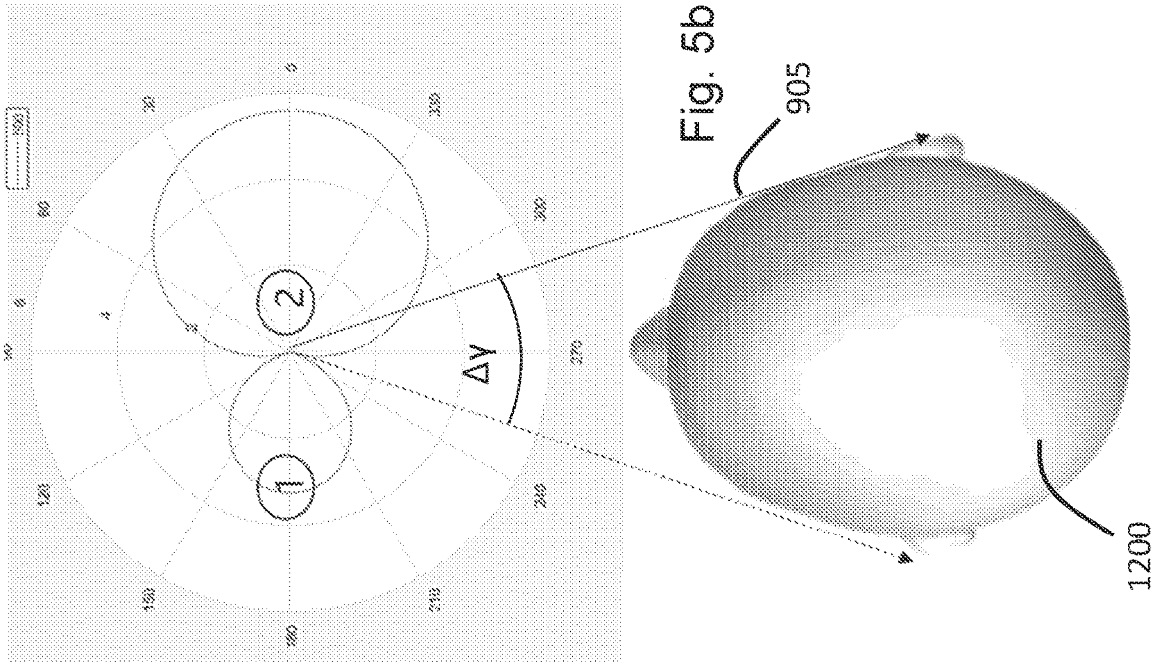
FIGS. 5*a* and *b* illustrate polar diagrams indicating the directional response of dipoles configured for crosstalk cancellation.
Figure 5A:
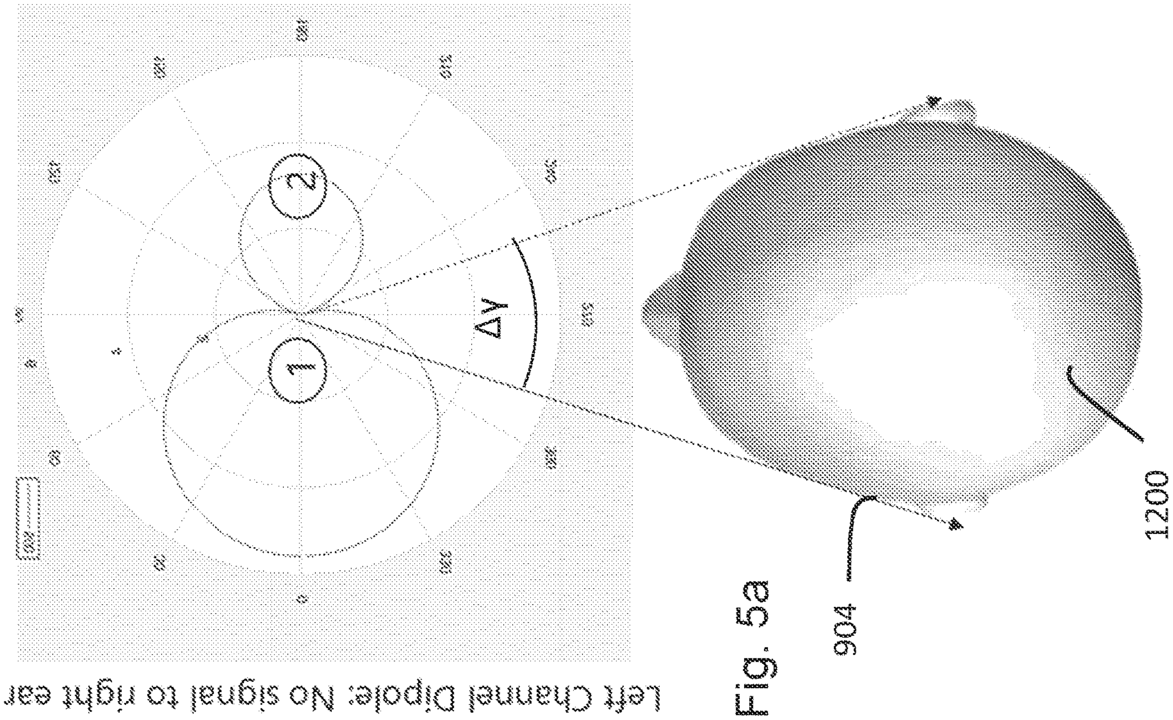

As can be taken from FIG. 10*a*, the horizontal MF and HF signals may be fed to a 2-way dipole based crosstalk cancellation network including a crossover unit 1305 and reproduced by the audio device 900. The horizontal HF may be equally split to the processing block 1307 for the first and third horizontal dipole DH1 and DH3, while the horizontal MF may be reproduced by the processing block 1309 for the second horizontal dipole DH2. The delay D may be adapted in order to achieve optimal crosstalk cancellation at the listener position, namely to steer the zeros of the Left and Right Dipole to the corresponding contralateral ear (as illustrated in FIGS. 5*a* and 5*b*). For example, if it is assumed that a "sweet spot" listener position is around 2 meters away in front of the audio device 900 (as illustrated in FIG. 9), the delay D can be adjusted until the correct position of the zeros is achieved, for instance, a delay D of 41 microseconds.

According to the embodiment illustrated in FIG. 10*a*, the horizontal LF horizontal signals can be summed with the vertical LF components of the vertical signals (described in more detail in the context of FIGS. 12*a* and 12*b*), and may be directly routed to the loudspeakers 903*b*, 903*d*, 903*f*, 903*h*, namely: horizontal and vertical LF from the first or left channel to the loudspeakers 903*f* and 903*h*, and horizontal and vertical LF from the right or second channel to the loudspeakers 903*b* and 903*d*. In this embodiment, the loudspeakers 903*b*, 903*c*, 903*d* and 903*h* may correspond to horizontal HF dipole components only and may therefore be less prone to over excursion.

The effect of the full processing chain for the horizontal components implemented by the processing circuitry 1310 of the audio device 900 according to an embodiment and shown in FIG. 10*a* may be that the listener sitting in front of the audio device 900 has the impression of being surrounded by the 7 horizontal speakers as defined by the 7.1.2 audio format.

A portion 1304 of the full processing chain for the horizontal components is illustrated in more detail in FIG. 10*b*. As can be taken from FIG. 10*b*, the processing circuitry 1310 of the audio device 900 may be configured to apply a bandpass filtering to the left hand side signal components LCH provided by the downmix unit 1303. Hereby, the crossover unit 1305*a* is used to obtain left hand side signal components LCH HF/2 in the first frequency range HF and left hand side signal components LCH MF in the second frequency range MF. Optionally, the crossover unit 1305*a* may be also used to obtain left hand side signal components LCH LF in a first frequency range LF. Moreover, the processing circuitry 1310 of the audio device 900 may be configured to implement a first dipole processing unit 1307*a* for generating components of the output signals for feeding the loudspeakers 903*b*, 903*d*, 903*f*, 903*h* of the first and fourth dipole DH1 and DH3 and to implement a second dipole processing unit 1309*a* for generating components of the output signals for feeding the loudspeakers 903*c*, 903*g* of the second dipole DH2.

Moreover, the processing circuitry 1310 of the audio device 900 may be configured to apply a bandpass filtering to the right hand side signal components RCH provided by the downmix unit 1303. Hereby, the crossover unit 1305*b* is used to obtain right hand side signal components RCH HF/2 in the first frequency range HF and right hand side signal components RCH MF in the second frequency range MF. Optionally, the crossover unit 1305*a* may be also used to obtain right hand side signal components RCH LF in a first frequency range LF. Moreover, the processing circuitry 1310 of the audio device 900 may be configured to implement a third dipole processing unit 1307*b* for generating further components of the output signals for feeding the loudspeakers 903*b*, 903*d*, 903*f*, 903*h* of the first and fourth dipole DH1 and DH3 and to implement a fourth dipole processing unit 1309*b* for generating further components of the output signals for feeding the loudspeakers 903*c*, 903*g* of the second horizontal dipole DH2.

Figure 11A:
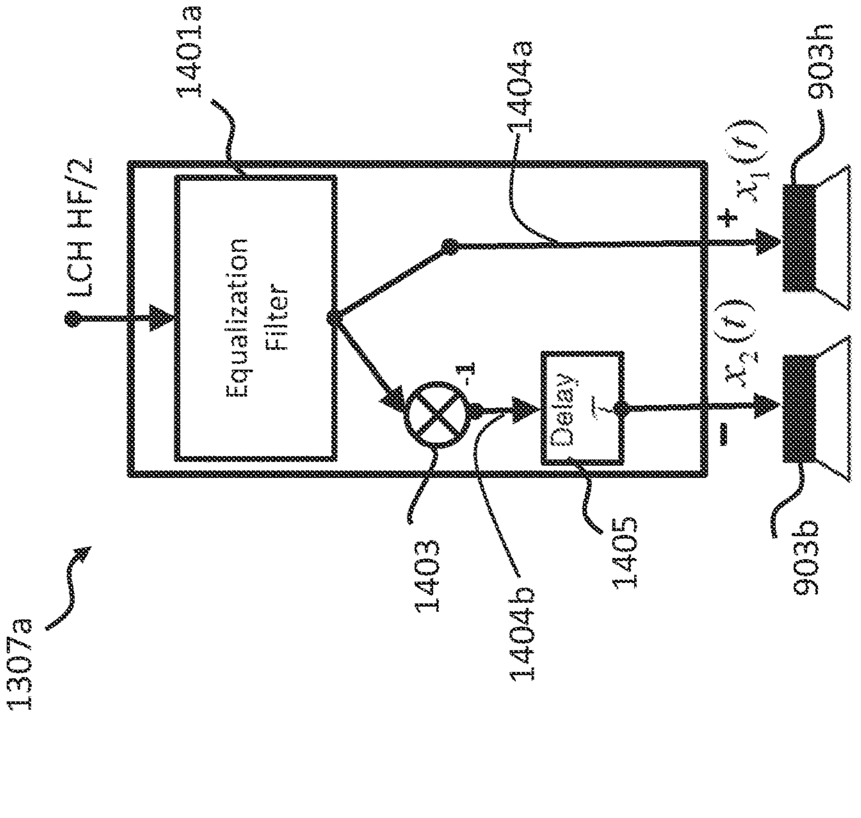
FIG. 11*a* schematically illustrates a dipole processing unit implemented by the processing circuitry of an audio device according to an exemplary embodiment.

A possible implementation of the first dipole processing unit 1307*a* for generating components of the output signals for feeding the loudspeakers 903*b*, 903*d*, 903*f*, 903*h* of the first and fourth dipole DH1 and DH3 is shown in FIG. 11*a*. As can be deduced from FIG. 11*a*, the left hand side signal components LCH HF/2 input to the first dipole processing unit 1307*a* may be provided to an equalization filter 1401. In a similar manner, the left hand side signal components LCH MF may be input to the second dipole processing unit 1309*a*.

Figure 11B:
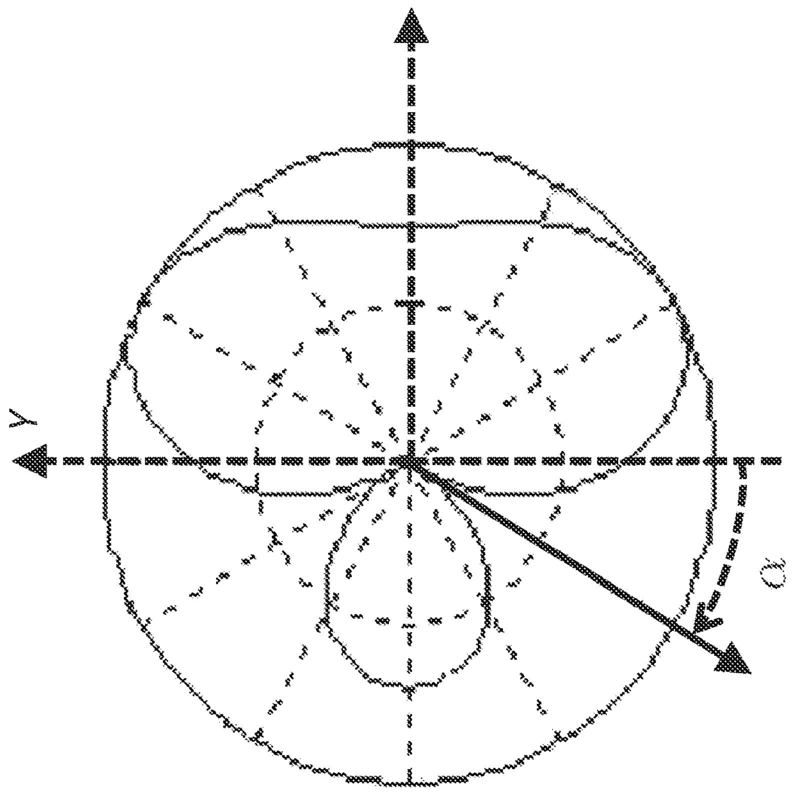
FIG. 11*b* depicts a polar diagram of the directional dipole response indicating the effect of delay introduced by the dipole processing unit according to FIG. 11*a;*

According to a first processing branch 1404*a* of the first dipole processing unit 1307*a* shown in FIG. 11*a* the intermediate signal provided by the equalization filter 1401 may be provided as an output signal at a plus-phased (+) output of the first dipole processing unit 1307*a*, for instance, to the loudspeaker 903*h* (e.g., for LCH HF/2). According to the second processing branch 1404*b* of the first dipole processing unit 1307*a* shown in FIG. 11*a* the intermediate signal provided by the equalization filter 1307 may be provided to an inverter unit 1403, to a delay unit 1405 and then as an output signal at a minus-phased (−) output of the first dipole processing unit 1307*a*, for instance, to the loudspeaker 903*b* (e.g., for LCH HF/2). As will be appreciated, the order of the inversion 1403 and the delay 1405 in the second processing chain of the first dipole processing unit 1307*a* could be changed. As already described in the context of FIGS. 4*a-c* above, by means of the delay added by the delay unit 1405 it may be possible to control and steer the direction of the null of the corresponding dipole. FIG. 11*b* shows the corresponding directional dipole response. The null of the dipole is steered by the angle $\alpha$. The second dipole processing unit 1309*a*, the third dipole processing unit 1307*b* and the fourth dipole processing unit 1309*b* shown in FIG. 10*b* may be implemented in the same way as the first dipole processing unit 1307*a*, as shown in FIG. 11*a* and described above.

According to some further implementations, the first dipole processing unit 1307*a* may also comprise the equalization filter 1403, the inverter unit 1403 and the delay unit 1405, however, the ordering of these elements may be modified. The same also applies to further implementations of the second dipole processing unit 1309*a*, the third dipole processing unit 1307*b* and the fourth dipole processing unit 1309*b*.

According to some further implementations, the first processing branch 1404*a* and the second processing branch 1404*b* of the first dipole processing unit 1307*a* may be interchanged with each other. In this case, the corresponding directional dipole response is different from FIG. 11*b* and may correspond to a mirroring transformation of the dipole response according to FIG. 11*b* along the y axis.

Figure 11C:
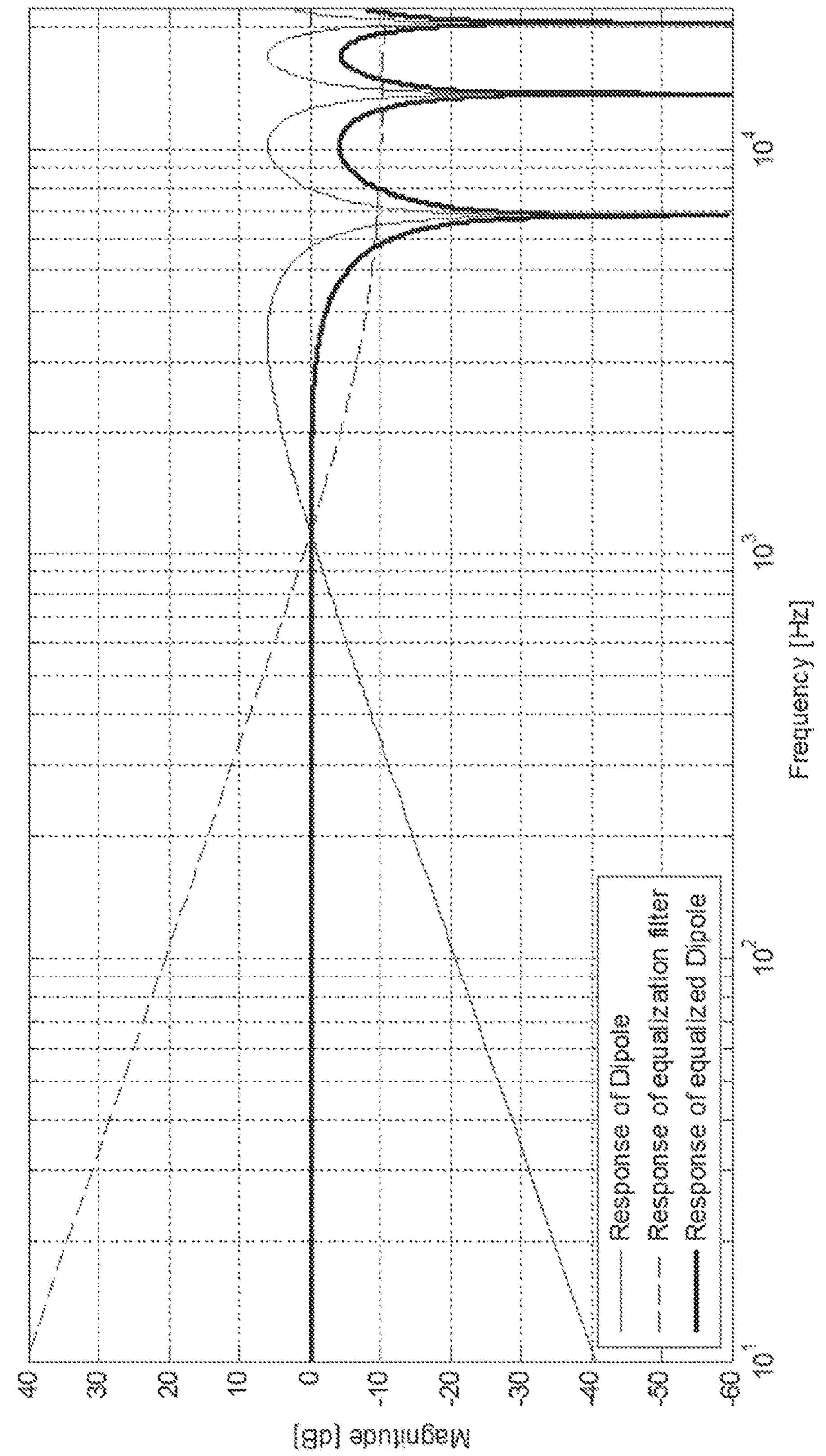
FIG. 11*c* represents a dipole response indicating the effect of equalization effected by the dipole processing unit according to some embodiments.
Figure 11D:
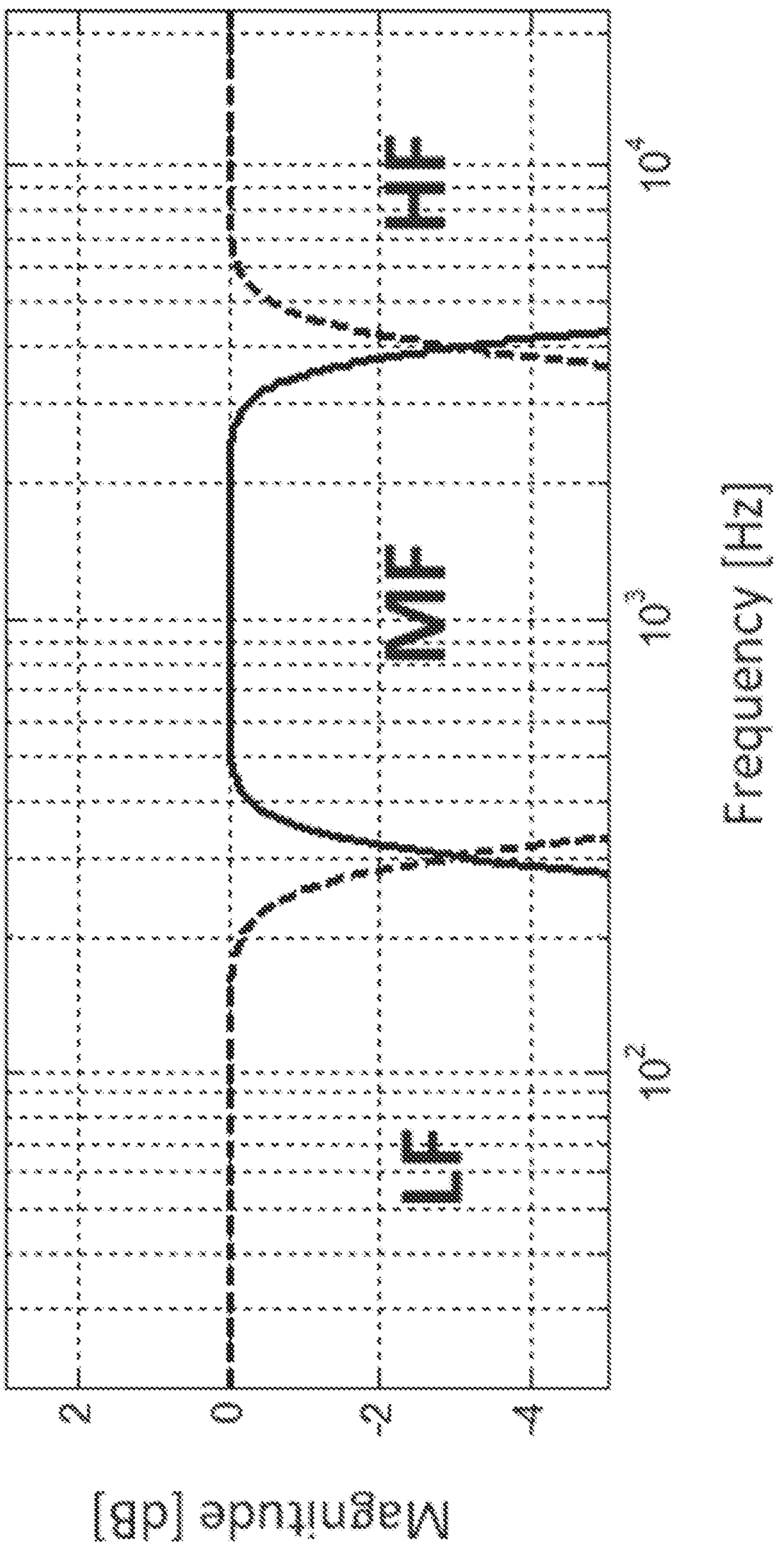
FIG. 11*d* depicts the effect of bandpass filtering provided by a crossover unit of the of the audio device according to an exemplary embodiment.

FIG. 11*c* represents a dipole response indicating the effect of equalization effected by the first dipole processing unit 1307*a* according to some embodiments. FIG. 11*d* depicts the effect of bandpass filtering provided by a crossover unit 1305*a* of the audio device 900 according to an exemplary embodiment. FIG. 11*c* depicts the directional response illustrating the "flattening" effect of the equalization filter 1401 of the first dipole processing unit 1307*a* according to some embodiments, while FIG. 11*d* illustrates exemplary HF, MF and LF frequency bands (with $f_L$ at 300 Hz and $f_H$ at 4 kHz) implemented by the crossover unit 1305*a* shown in FIG. 10*b*. As already described, the suitable transition frequencies primarily depend on the distance between the loudspeakers 903*a*-903*h* defining the dipoles and the configuration of the vertical and horizontal dipoles. Optimally, the larger the distance between the loudspeakers 903*a*-903*h*, the lower the frequencies reproduced by that pair of loudspeakers 903*a*-903*h*.

As can be deduced from FIG. 10*b* again, the processing circuitry 1310 of the audio device 900 is configured to generate, for instance, the output signals for driving the loudspeakers 903*b* and 903*h* of the first dipole DH1 in the following way. A first component (e.g., left channel component) of the output signal for the loudspeaker 903*b* is provided as the output signal at the minus-phased (−) output of the first dipole processing unit 1307*a*, which is based on the left hand side signal component LCH HF/2 in the first frequency range HF. A second component (e.g., right channel component) of the output signal for the loudspeaker 903*b* is provided as the output signal at the plus-phased (+) output of the third dipole processing unit 1307*b*, which is based on the right hand side signal component RCH HF/2 in the first frequency range HF. Likewise, a first (e.g., left channel) component of the output signal for the loudspeaker 903*h* is provided as the output signal at the plus-phased (+) output of the first dipole processing unit 1307*a*, which is based on the left hand side signal component LCH HF/2 in the first frequency range HF. A second (e.g., right channel) component of the output signal for the loudspeaker 903*h* is provided as the output signal at the minus-phased (−) output of the third dipole processing unit 1307*b*, which is based on the right hand side signal component RCH HF/2 in the first frequency range. As can be taken from FIG. 10*b*, the same processing can be used for generating the first (e.g., left channel) and second (e.g., right channel) components of the output signals for the loudspeakers 903*d* and 903*f* of the fourth horizontal dipole DH3.

As can be taken from FIG. 10*b*, the processing circuitry 1310 of the audio device 900 is configured to generate the output signals for driving the loudspeakers 903*c* and 903*g* of the second dipole DH2 (having a larger dipole distance than the first and fourth dipole DH1 and DH3) in the following way. A first (e.g., left channel) component of the output signal for the loudspeaker 903*c* is provided as the output signal at the minus-phased (−) output of the second dipole processing unit 1309*a*, which is based on the left hand side signal component LCH MF in the second frequency range. A second (e.g., right channel) component of the output signal for the loudspeaker 903*c* is provided as the output signal at the plus-phased (+) output of the fourth dipole processing unit 1309*b*, which is based on the right hand side signal component RCH MF in the second frequency range MF. Likewise, a first (e.g., left channel) component of the output signal for the loudspeaker 903*g* is provided as the output signal at the plus-phased (+) output of the second dipole processing unit 1309*a*, which is based on the left hand side signal component LCH MF in the second frequency. A second (e.g., right channel) component of the output signal for the loudspeaker 903*g* is provided as the output signal at the minus-phased (−) output of the fourth dipole processing unit 1309*b*, which is based on the right hand side signal component RCH MF in the second frequency range MF.

The LF band limited right channel or left channel signals can be directly output to a subset of the plurality of loudspeakers 903*a*-903*h*, such as the loudspeakers 903*f* and 903*h* and/or 903*b* and 903*d*, or even to all loudspeakers 903*a*-903*h*.

Figure 12A:
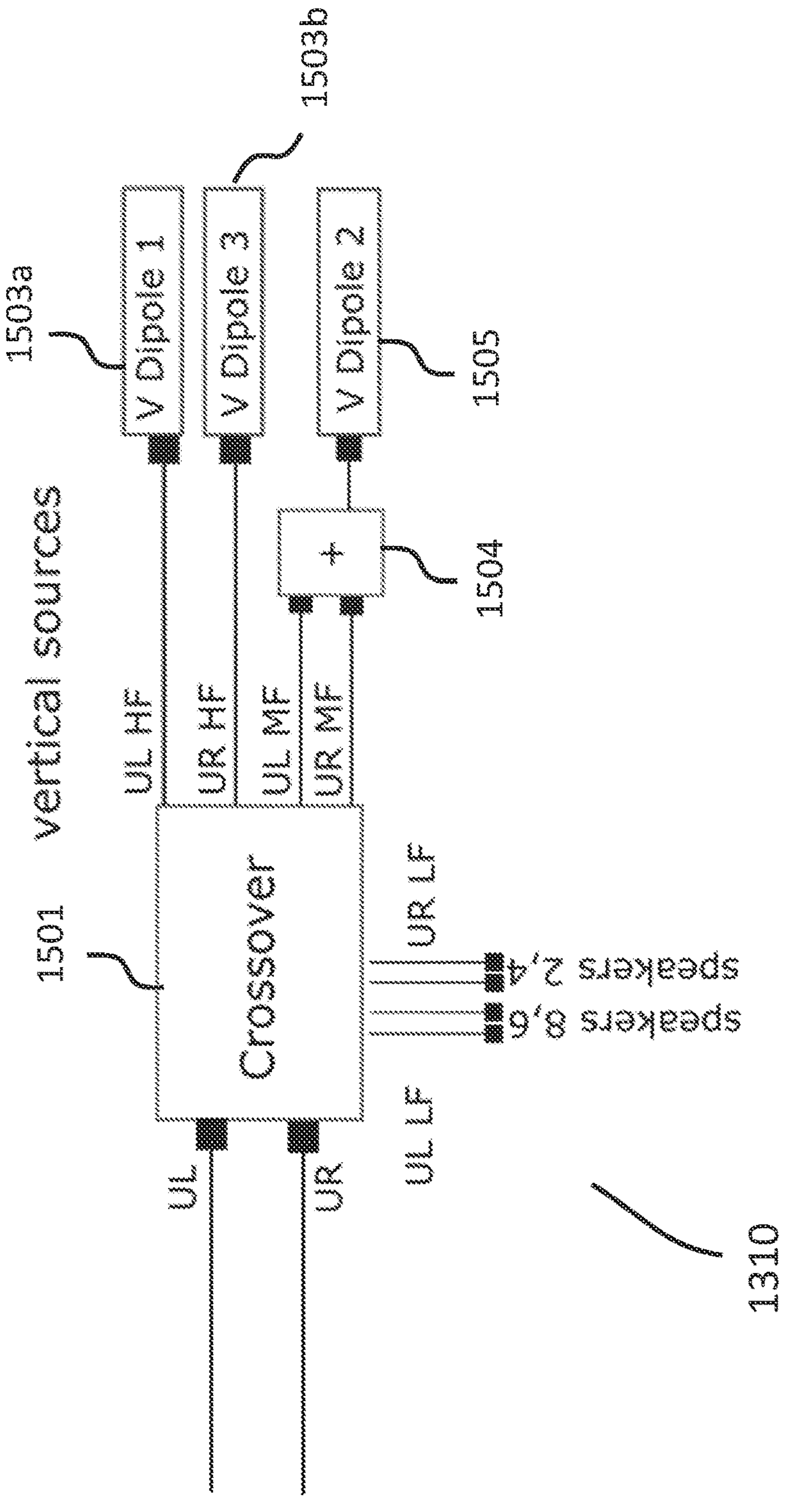
FIGS. 12*a* and *b* schematically illustrate vertical processing portions of the processing circuitry of an audio device according to an exemplary embodiment.

FIGS. 12*a, b* schematically illustrate vertical processing portions of the processing circuitry 1310 of an audio device according to an exemplary embodiment. Hereby, processing the plurality of vertical left and right hand side components UL, UR and obtaining the output signals for the vertical dipoles DV1, DV2 and DV3 is depicted. According to some embodiments, these vertical left and right hand side components UL, UR may also be indicated as elevated hand side components UL, UR. In the embodiment shown in FIGS. 12*a* and 12*b*, the output signals for the vertical dipoles DV1, DV2 and DV3 are generated by the processing circuitry 1310 of the audio device 900 on the basis of the vertical channels of a multichannel input signal according to the audio format 7.1.2, namely the vertical left and right hand side components UL and UR.

As can be taken from FIG. 12*a*, according to an embodiment the processing circuitry 1310 of the audio device 900 is configured to apply a low-pass (LF), band-pass (MF) and high-pass (HF) filtering to the vertical left and right hand side components UL and UR signal using a crossover unit 1501 in order to obtain a vertical three way stereo signal (UL HF, UR HF: UL MF. UR MF: UL LF, UR LF). Similar considerations as for the horizontal components hold (e.g., for setting the transition frequencies of the filters employed by the crossover unit 1501). According to an embodiment, the sum of vertical UL MF and UR MF is fed to the fifth dipole DV2 (i.e., the central vertical dipole), while the UL HF is fed to the third dipole DV1 (i.e., the left hand side vertical dipole) and the UR HF is fed to the sixth dipole DV3 (i.e., the right hand side vertical dipole). The LF band limited signals, i.e., UL LF and UR LF, can be directly output to a subset of the plurality of loudspeakers 903*a*-903*h*, such as the loudspeakers 903*f* and 903*h* and/or 903*b* and 903*d*, or even to all loudspeakers 903*a*-903*h*. Hereby, LF band limited signals may be emitted commonly using monopole transducers.

Figure 12B:
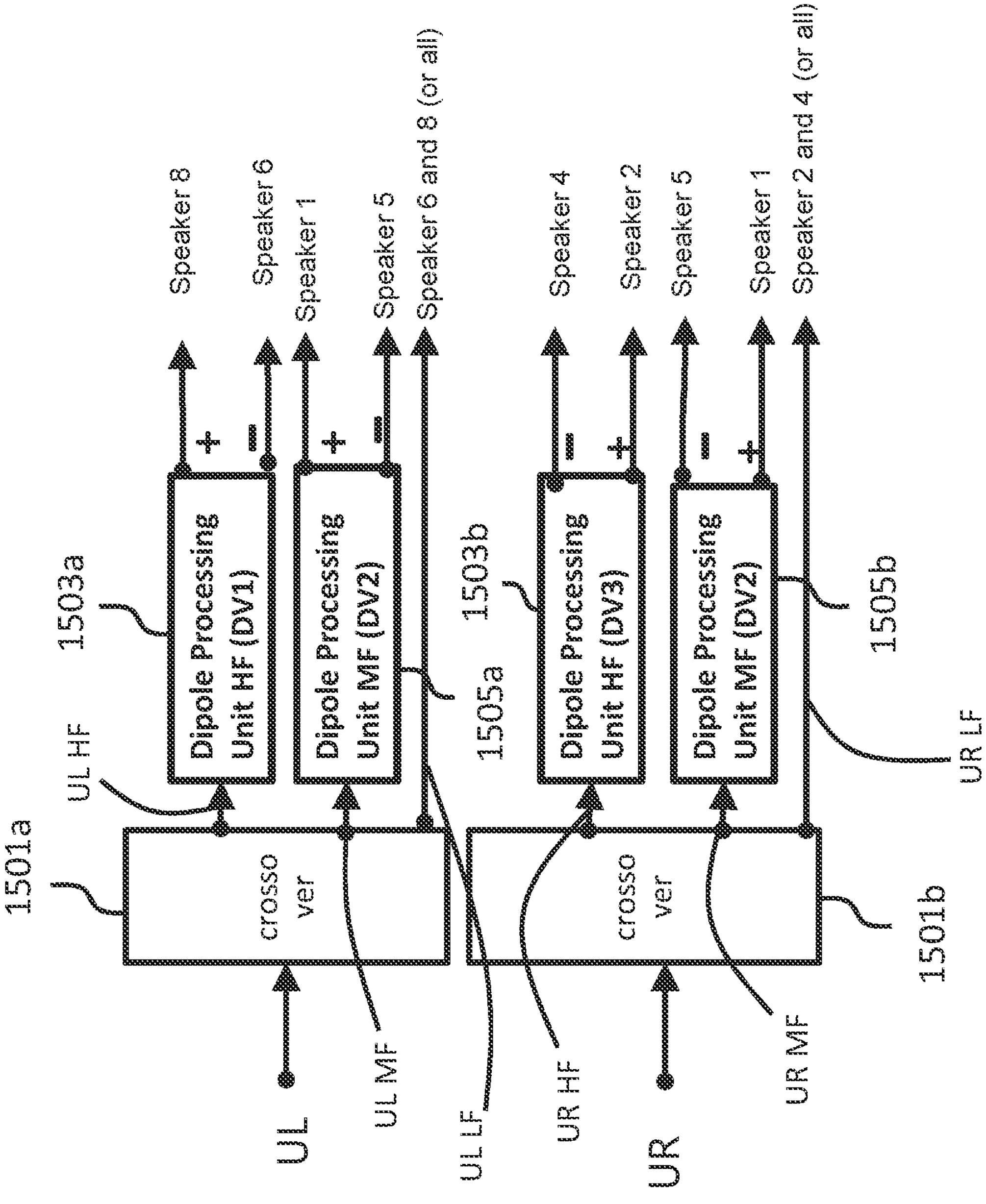

FIG. 12*b* provides additional specifications regarding generating the output signals for the vertical dipoles DV1, DV2 and DV3 according to an embodiment, which is similar to the processing for the horizontal dipoles DH1-DH3 depicted in FIG. 10*b* in that for providing the output signals for the vertical dipoles, dipole processing units 1503*a*, 1505*a*, 1503*b*, 1505*b* are used, which can be similar to or identical to the first dipole processing unit 1307*a* shown in FIG. 11*a* and described above.

According to an embodiment, the processing circuitry 1310 of the audio device 900 is configured to generate the output signals for driving the loudspeakers 903*a* and 903*e* of the fifth dipole DV2 (having a larger dipole distance than the third and sixth dipole DV1 and DV3) in the following way. A first, e.g., elevated, component of the output signal for the loudspeaker 903*a* is provided as the output signal at the plus-phased (+) output of the dipole processing unit 1505*a*, which is based on the vertical left hand side signal component UL MF in the second frequency range MF. A second, e.g., deepened, component of the output signal for the loudspeaker 903*a* is provided as the output signal at the minus-phased (−) output of the dipole processing unit 1505*b*, which is based on the vertical right hand side signal component UR MF in the second frequency range MF. Likewise, a first component of the output signal for the loudspeaker 903*e* is provided as the output signal at the minus-phased (−) output of the dipole processing unit 1505*a*, which is based on the vertical left hand side signal component UL MF in the second frequency range MF. The second component of the output signal for the loudspeaker 903*e* is provided as the output signal at the plus-phased (+) output of the dipole processing unit 1505*b*, which is based on the vertical right hand side signal component UR MF in the second frequency range MF.

As further illustrated in FIG. 12*b*, the output signal for the loudspeaker 903*h* of the third dipole DV1 can be provided as the output signal at the plus-phased (+) output of the dipole processing unit 1503*a*, which is based on the vertical left hand side signal component UL HF in the first frequency range HF, while the output signal for the loudspeaker 903*f* of the third dipole DV1 can be provided as the output signal at the minus-phased (−) output of the dipole processing unit 1503*a*. Likewise, the output signal for the loudspeaker 903*d* of the sixth dipole DV3 can be provided as the output signal at the minus-phased (−) output of the dipole processing unit 1503*b*, which is based on the vertical right hand side signal component UR HF in the first frequency range HF while the output signal for the loudspeaker 903*b* of the sixth dipole DV3 can be provided as the output signal at the plus-phased (+) output of the dipole processing unit 1503*b*.

As in the case of the horizontal dipoles, the LF band limited signals, i.e., UL LF and UR LF, can be directly output to a subset of the plurality of loudspeakers 903*a*-903*h*, such as the loudspeakers 903*f* and 903*h* and/or 903*b* and 903*d*, or even to all loudspeakers 903*a*-903*h*.

Figure 13:
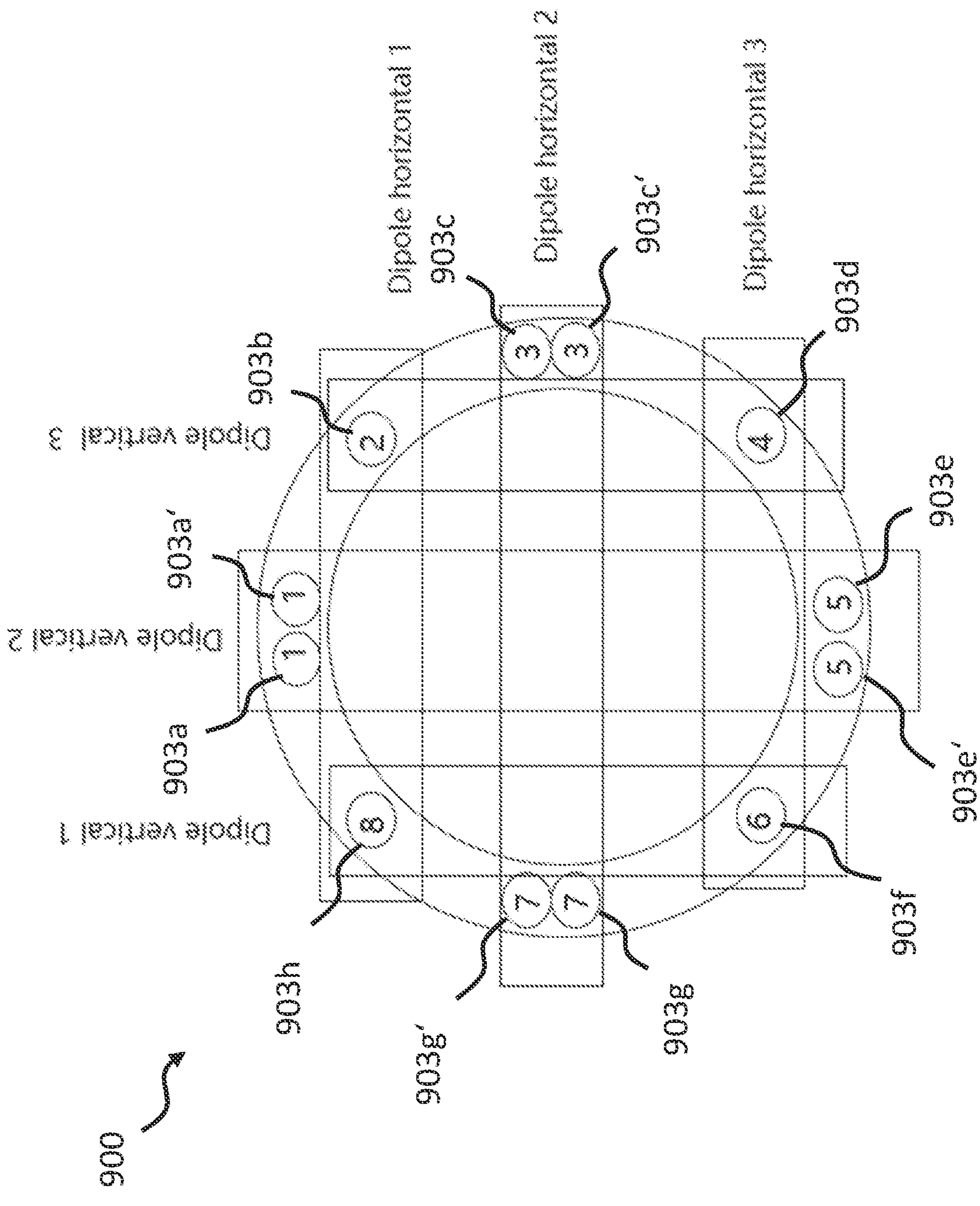
FIG. 13 schematically depicts an audio device according to a further exemplary embodiment of the present disclosure implementing a plurality of horizontal dipoles for crosstalk cancellation and a plurality of vertical dipoles for sound elevation.

FIG. 13 schematically depicts an audio device 900 according to a further exemplary embodiment of the present disclosure implementing a plurality of horizontal dipoles DH1-DH3 for crosstalk cancellation and a plurality of vertical dipoles DV1-DV3 for sound elevation 1204*a*. 1204*b*. The embodiment of the audio device 900 shown in FIG. 13 differs from the audio device 900 shown in FIG. 8 in that in the embodiment of FIG. 13, the second dipole DH2 and/or the fifth dipole DV2 are formed by four "identical" loudspeakers, namely the second dipole DH2 by the loudspeakers 903*c*. 903*c*' and 903*g*. 903*g*' and the fifth dipole DV2 by the loudspeakers 903*a*. 903*a*' and 903*e*. 903*e*'. This allows to increase intensity of the frequency ranges transmitted by the second dipole DH2 and/or the fifth dipole DV2. According to some embodiments, the second frequency range of the second dipole DH2 and/or the fifth frequency range of the fifth dipole DV may correspond to a MF range. In this case. MF frequency range intensities of the soundfield may be increased. According to some embodiments, this may be because a single loudspeaker may quickly reach its maximum excursion so that distortion may occur. Thus, using at least two loudspeakers to implement a respective monopole allows for providing more headroom to the loudspeakers as well as reducing $f_M$, thereby pushing the frequency bands in which the spatial rendering is effective to specific frequencies.

Figure 14:
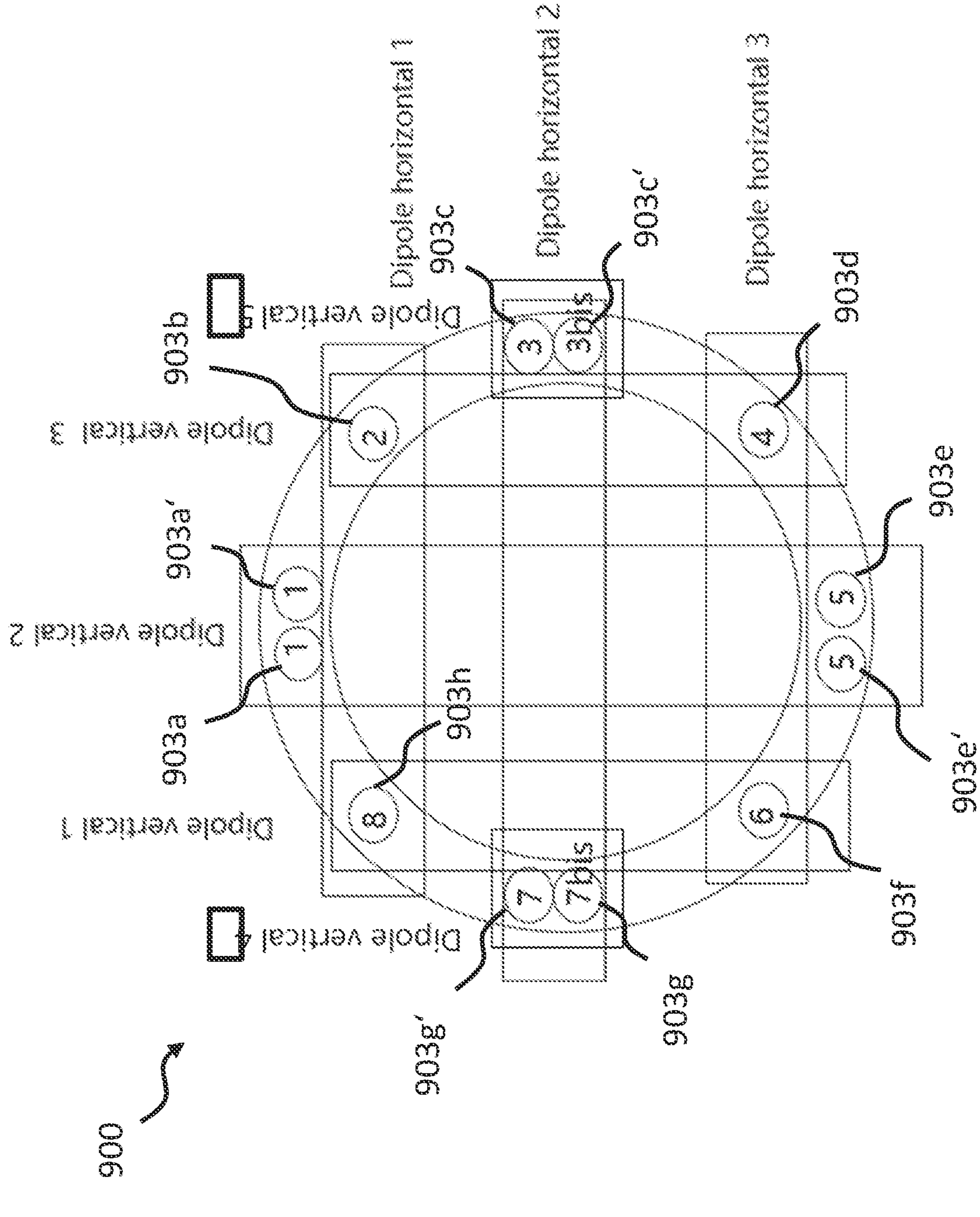
FIG. 14 schematically depicts an audio device according to a further exemplary embodiment of the present disclosure implementing a plurality of horizontal dipoles for crosstalk cancellation and a plurality of vertical dipoles for sound elevation.

FIG. 14 schematically depicts an audio device 900 according to a further exemplary embodiment of the present disclosure implementing a plurality of horizontal dipoles DH1-DH3 for crosstalk cancellation and a plurality of vertical dipoles DV1-DV3 for sound elevation 1204*a*-1204*b*. Hereby. FIG. 14 refers to a modification of the embodiment according to FIG. 13. In the embodiment shown in FIG. 14, the processing circuitry 1310 of the audio device 900 is configured to process the plurality of input signals L. R. UL. UR such that the loudspeaker 903*c* and the immediately adjacent loudspeaker 903*c*' form an seventh dipole DV5 for sound elevation 1204*a*. 1204*b* of the soundfield and/or the loudspeaker 903*g* and the immediately adjacent loudspeaker 903*g*' form an eighth dipole DV4 for sound elevation 1204*a*. 1204*b* of the soundfield. As can be taken from FIG. 14, the dipole distances of the vertical dipoles DV4 and/or DV5 are even smaller than the dipole distances of the dipoles DV1. DV2 and DV3. For generating the output signals for the loudspeakers of the dipoles DV4 and/or DV5, the same approach as for the embodiment shown in FIGS. 8, 12*a*, 12*b* can be used. More specifically, the Vertical High Frequencies (HighF-V) can still be split into two parts, namely Mid-HighF-V and Very HighF-V, introducing a cutoff frequency $f_H$ that can be set considering the beaming frequency (also called aliasing frequency) of the Mid-High Dipoles, i.e., the third and sixth dipole DV1 and DV3.

Figure 15:
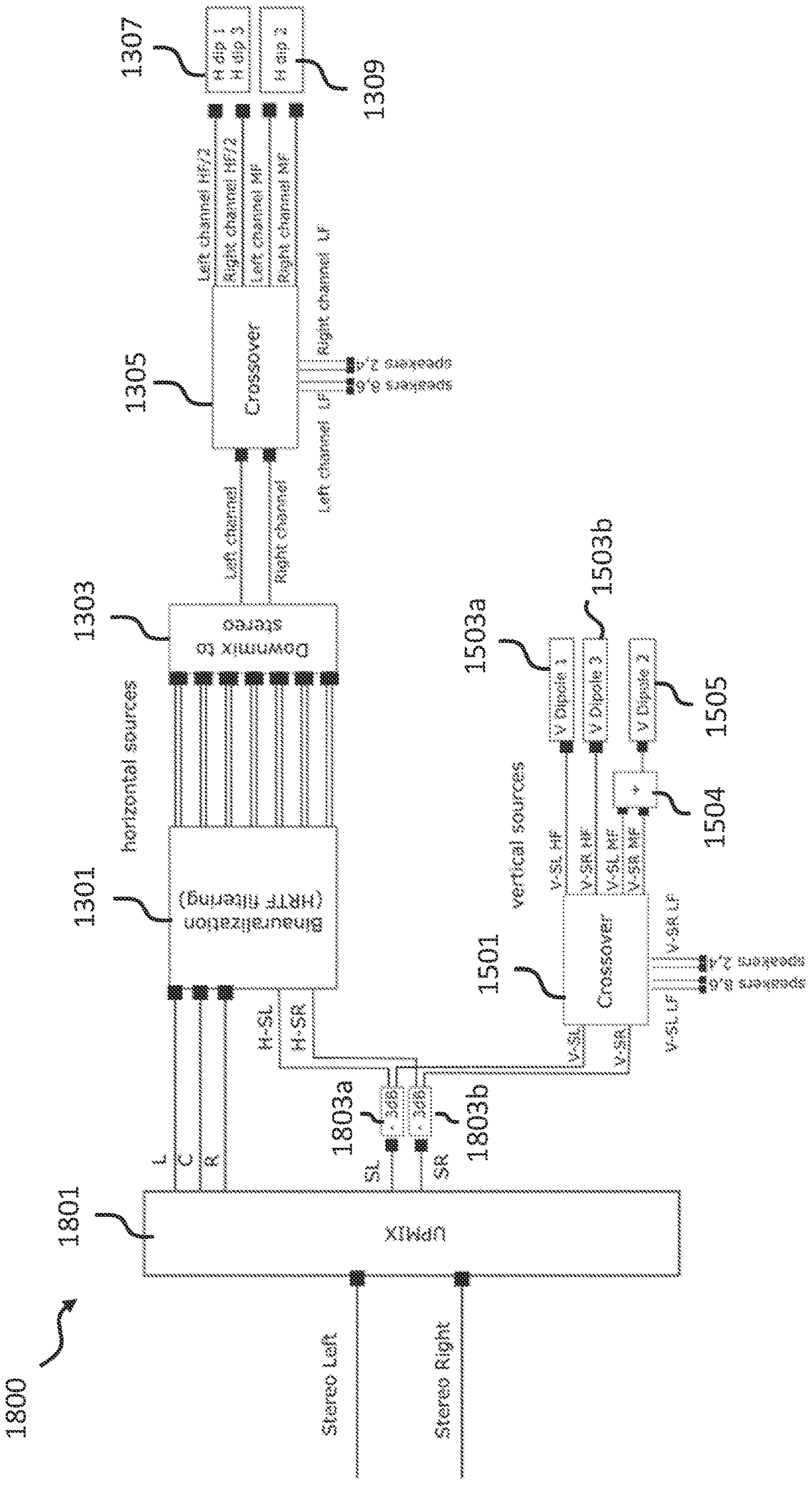
FIG. 15 is a schematic diagram illustrating a portion of the processing circuitry of an audio device according to an exemplary embodiment for obtaining the output signals for horizontal and vertical dipoles.

FIG. 15 is a schematic diagram illustrating a portion of the processing circuitry 1310 of the audio device 900 according to a further embodiment. In the embodiment shown in FIG. 15, the audio device 900 is configured to reproduce a stereo input signal by further comprising an upmixing stage 1801 that is configured to extract the ambience components of the stereo input signal. For further details concerning a possible implementation of the upmixing stage 1801, reference is made to Chan Jun Chun, et al, "Upmixing Stereo Audio into 5.1 Channel Audio for Improving Audio Realism", Signal Processing, Image Processing and Pattern Recognition. SIP 2009. Communications in Computer and Information Science, vol 61. Springer, Berlin, Heidelberg, which is fully incorporated by reference herein. As illustrated in FIG. 15, the upmixing stage 1801 has a stereo input (L and R) and can output a 5.1 output signal, i.e., L, R, C, SR, SL, LFE. According to an embodiment, the reproduction strategy for L, R, C and LFE is identical to the one for the 7.1.2 case illustrated in FIGS. 10*a, b* and 12*a, b*. In order to force content for the elevated channels, the ambience channels SR and SL can be each split in 2 components: for example the SR channel and the SL channel can be attenuated by 3 dB using respective attenuation stages 1803*a, b* and duplicated to form a Horizontal SR and SL, H-SR and H-SL, signal and a Vertical SR and SL, V-SR and V-SL, signal. The rest of the processing is identical or at least similar to the processing already described in the context of FIGS. 10*a, b* and 12*a, b*.

In a modification of the embodiment shown in FIG. 15, the plurality of input signals L, R, UL, UR can be the signals according to the 5.1 audio format. In this case there is no need for the upmixing stage 1801, and the vertical component can be obtained as in the previous embodiment from the SR and SL ambience channels.

Figure 16:
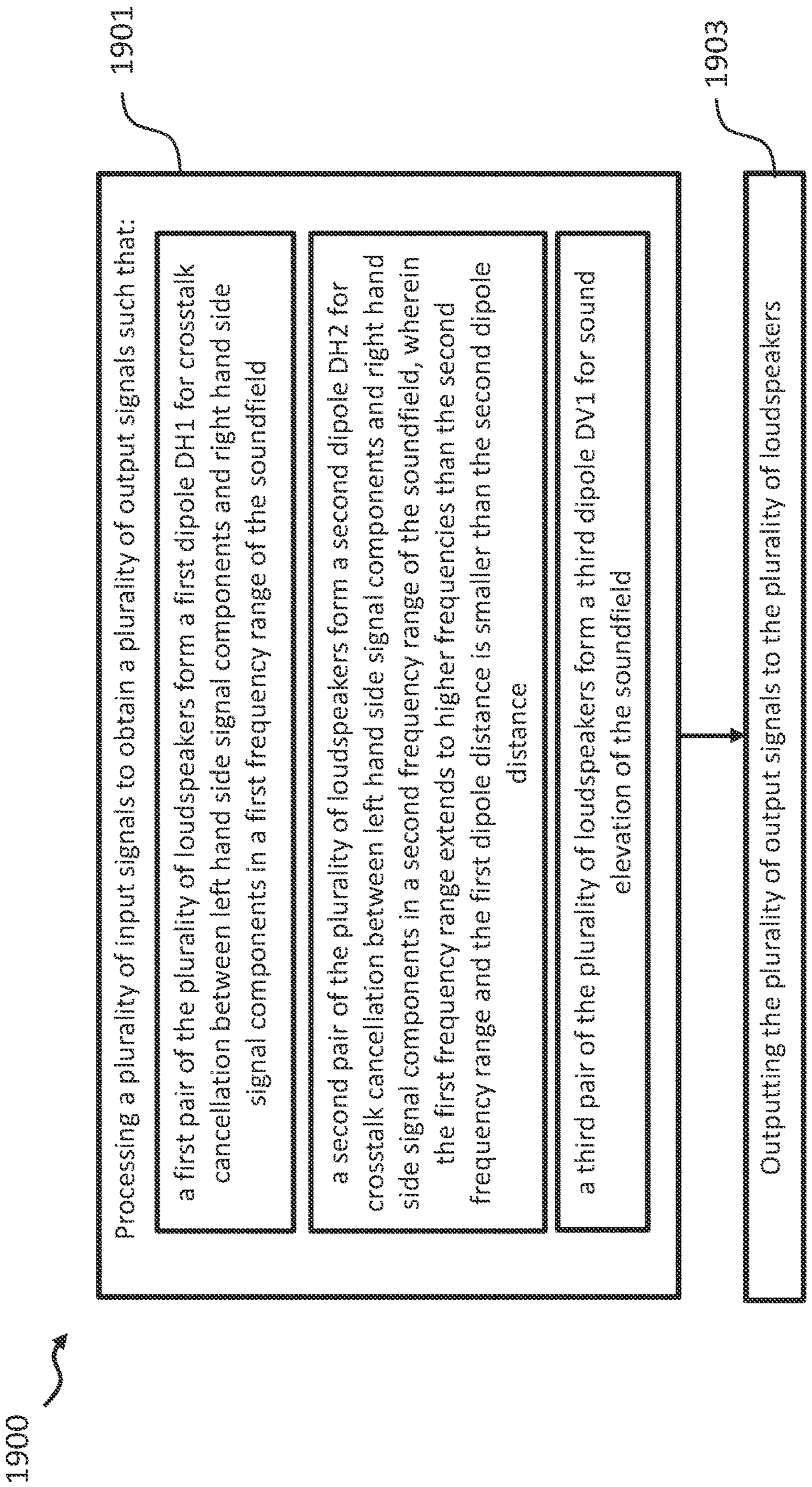
FIG. 16 depicts a flow diagram illustrating a method for generating a three-dimensional soundfield according to an embodiment of the present disclosure.

FIG. 16 is a flow diagram illustrating a method 1900 for generating a three-dimensional soundfield according to an embodiment of the present disclosure. The method 1900 comprises the step 1901 of processing a plurality of input signals L, R, UL, UR to obtain a plurality of output signals and the step 1903 of outputting the plurality of output signals LCH HF/2, RCH HF/2, LCH MF, RCH MF, UL HF, UR HF, UL MF, UR MF to the plurality of loudspeakers 903*a*-903*h*. According to the method 1900, the plurality of input signals are processed such that:

a first pair of the plurality of loudspeakers 903*a*-903*h* form a first dipole DH1 for crosstalk cancellation between left hand side signal components 904 and right hand side signal components 905 in a first frequency range of the soundfield;

a second pair of the plurality of loudspeakers 903*a*-903*h* form a second dipole DH2 for crosstalk cancellation between left hand side signal components 904 and right hand side signal components 905 in a second frequency range of the soundfield, wherein the first frequency range extends to higher frequencies than the second frequency range and a distance between the loudspeakers of the plurality of loudspeakers forming the first dipole DH1 is smaller than a distance between the loudspeakers of the plurality of loudspeakers forming the second dipole DH2; and a third pair of the plurality of loudspeakers 903*a*-903*h* form a third dipole DV1 for sound elevation 1204*a*, 1204*b* of the soundfield.

A person skilled in the art will understand that the "blocks" ("units") of the various figures (method and apparatus) represent or describe functionalities of embodiments of the present disclosure (rather than necessarily individual "units" in hardware or software) and thus describe equally functions or features of apparatus embodiments as well as method embodiments (unit=step).

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the solutions of the embodiments.

In addition, functional units in the embodiments of the present disclosure may be integrated into one processing unit, or each of the units may exist alone physically, or two or more units are integrated into one unit.

What is claimed is:

1. An audio device for generating a three-dimensional soundfield, wherein the audio device comprises:

a housing arranged in an operation orientation having a substantially vertical main plane, the housing having an elliptical torus shape and a plurality of loudspeakers, wherein a first plurality of the plurality of loudspeakers are mounted on a coplanar surface of the housing and a second plurality of the plurality of loudspeakers are mounted on a periphery of the elliptical torus shape; and a processing circuitry configured to process a plurality of input signals, to obtain a plurality of output signals and output the plurality of output signals to the plurality of loudspeakers, wherein the processing circuitry is configured to process the plurality of input signals (such that:

a first pair of the plurality of loudspeakers form a first dipole for crosstalk cancellation between left hand side signal components and right hand side signal components in a first frequency range of the soundfield;

a second pair of the plurality of loudspeakers form a second dipole for crosstalk cancellation between left hand side signal components and right hand side signal components in a second frequency range of the soundfield; and a third pair of the plurality of loudspeakers form a third dipole for sound elevation of the soundfield;

wherein the first frequency range extends to higher frequencies than the second frequency range and a distance between the loudspeakers of the plurality of loudspeakers forming the first dipole is smaller than a distance between the loudspeakers of the plurality of loudspeakers forming the second dipole.

2. The audio device according to claim 1, wherein the first frequency range comprises a high frequency range and/or the second frequency range comprises a mid frequency range.

3. The audio device according to claim 1, wherein at least one loudspeaker of the first pair of the plurality of loudspeakers or the second pair of the plurality of loudspeakers is also a part of the third pair of the plurality of loudspeakers.

4. The audio device according to claim 1, wherein the housing mounting the plurality of loudspeakers has a circular torus shape.

5. The audio device according to claim 1, wherein an arrangement of the loudspeakers of the plurality of loudspeakers forming the first dipole defines a first dipole orientation and an arrangement of the loudspeakers of the plurality of loudspeakers forming the third dipole defines a third dipole orientation, wherein a first dipole orientation angle ($\eta 1$) defined by the third dipole orientation relative to the first dipole orientation is in a range of $65° \leq \eta 1 \leq 115°$.

6. The audio device according to claim 1, wherein the processing circuitry is configured to process the plurality of input signals such that:

a fourth pair of the plurality of loudspeakers form a fourth dipole for crosstalk cancellation between left hand side signal components and right hand side signal components in a fourth frequency range of the soundfield;

wherein the fourth frequency range extends to higher frequencies than the second frequency range and a distance between the loudspeakers of the plurality of loudspeakers forming the fourth dipole is smaller than the distance between the loudspeakers of the plurality of loudspeakers forming the second dipole.

7. The audio device according to claim 1, wherein the processing circuitry is configured to process a first subset of the plurality of input signals to obtain left hand side signal components, and wherein for obtaining the output signals for the first pair of loudspeakers and the second pair of loudspeakers, the processing circuitry is configured to:

apply a bandpass filtering to the left hand side signal components to obtain the left hand side signal components in the first frequency range and the left hand side signal components in the second frequency range;

apply a first dipole processing using a first equalizing to the left hand side signal components in the first frequency range for obtaining a first component of the output signal for a first loudspeaker of the first pair of loudspeakers and the first equalizing, an inverting and a delaying to the left hand side signal components in the first frequency range for obtaining a first component of the output signal for a second loudspeaker of the first pair of loudspeakers; and apply a second dipole processing using a second equalizing to the left hand side signal components in the second frequency range for obtaining a first component of the output signal for a first loudspeaker of the second pair of loudspeakers (and the second equalizing, an inverting and a delaying to the left hand side signal components in the second frequency range for obtaining a first component of the output signal for a second loudspeaker of the second pair of loudspeakers.

8. The audio device according to claim 7, wherein the processing circuitry is further configured to process the first subset of the plurality of input signals to obtain right hand side signal components, and wherein for obtaining the output signals for the first pair of loudspeakers and the second pair of loudspeakers, the processing circuitry is further configured to:

apply the bandpass filtering to the right hand side signal components to obtain the right hand side signal components in the first frequency range and right hand side signal components in the second frequency range;

apply a third dipole processing using the first equalizing to the right hand side signal components in the first frequency range for obtaining a second component of the output signal for the second loudspeaker of the first pair of loudspeakers and using the first equalizing, an inverting and a delaying to the right hand side signal components in the first frequency range for obtaining a second component of the output signal for the first loudspeaker of the first pair of loudspeakers; and apply a fourth dipole processing using the second equalizing to the right hand side signal components in the second frequency range for obtaining a second component of the output signal for the second loudspeaker of the second pair of loudspeakers and using the second equalizing, an inverting and a delaying to the right hand side signal components in the second frequency range for obtaining a second component of the output signal for the first loudspeaker of the second pair of loudspeakers.

9. The audio device according to claim 7, wherein for obtaining the left hand side signal components and right hand side signal components, the processing circuitry is further configured to:

apply a binauralizing based on a convolution of each input signal of the first subset of the plurality of input signals with a first binaural filter and a second binaural filter to obtain a first and a second binaurally filtered version of each input signal; and apply downmixing to generate the left hand side signal components and right hand side signal components based on the first and second binaurally filtered version of each input signal.

10. The audio device according to claim 1, wherein the processing circuitry is configured to process the plurality of input signals such that:

the third pair of the plurality of loudspeakers form the third dipole for the sound elevation in a third frequency range of the soundfield;

a fifth pair of the plurality of loudspeakers form a fifth dipole for the sound elevation in a fifth frequency range of the soundfield;

wherein the third frequency range extends to higher frequencies than the fifth frequency range and a distance between the loudspeakers of the plurality of loudspeakers forming the third dipole is smaller than a distance between the loudspeakers of the plurality of loudspeakers forming the fifth dipole.

11. The audio device according to claim 10, wherein the third frequency range corresponds to the first frequency range and/or the fifth frequency range corresponds to the second frequency range.

12. The audio device according to claim 10, wherein the plurality of input signals comprise vertical left hand side signal components, and wherein for obtaining the output signals for the third pair of loudspeakers and the fifth pair of loudspeakers the processing circuitry is configured to:

apply a bandpass filtering to the vertical left hand side signal components to obtain the vertical left hand side signal components in the first frequency range and the vertical left hand side signal components in the second frequency range;

apply a fifth dipole processing using a first equalizing to the vertical left hand side signal components in the first frequency range for obtaining the output signal for a first loudspeaker of the third pair of loudspeakers and using the first equalizing, an inverting and a delaying to the vertical left hand side signal components in the first frequency range for obtaining the output signal for a second loudspeaker of the third pair of loudspeakers; and apply a sixth dipole processing using a second equalizing to the vertical left hand side signal components in the second frequency range for obtaining a first component of the output signal for a first loudspeaker of the fifth pair of loudspeakers and using the second equalizing, an inverting and a delaying to the vertical left hand side signal components in the second frequency range (for obtaining a first component of the output signal for a second loudspeaker of the fifth pair of loudspeakers.

13. The audio device according to claim 1, wherein the processing circuitry is configured to process the plurality of input signals such that the second pair of the plurality of loudspeakers and a further pair of the plurality of loudspeakers form the second dipole, wherein a first loudspeaker of the further pair of loudspeakers is arranged in the housing adjacent to a first loudspeaker of the second pair of loudspeakers and a second loudspeaker of the further pair of loudspeakers is arranged in the housing adjacent to a second loudspeaker of the second pair of loudspeakers.

14. The audio device according to claim 13, wherein the processing circuitry is configured to process the plurality of input signals such that the first loudspeaker of the second pair of loudspeakers and the first loudspeaker of the further pair of loudspeakers form an seventh dipole (for the sound elevation of the soundfield and/or the second loudspeaker of the second pair of loudspeakers and the second loudspeaker of the further pair of loudspeakers form an eighth dipole for the sound elevation of the soundfield.

15. A method for generating a three-dimensional soundfield using an audio device with a housing arranged in an operation orientation having a substantially vertical main plane, the housing having an elliptical torus shape and a plurality of loudspeakers, wherein a first plurality of the plurality of loudspeakers are mounted on a coplanar surface of the housing and a second plurality of the plurality of loudspeakers are mounted on a periphery of the elliptical torus shape, wherein the method comprises:

processing a plurality of input signals (to obtain a plurality of output signals; and outputting the plurality of output signals to the plurality of loudspeakers, wherein the plurality of input signals are processed such that:

a first pair of the plurality of loudspeakers form a first dipole for crosstalk cancellation between left hand side signal components and right hand side signal components in a first frequency range of the soundfield;

a second pair of the plurality of loudspeakers form a second dipole for crosstalk cancellation between left hand side signal components and right hand side signal components in a second frequency range of the soundfield; and a third pair of the plurality of loudspeakers form a third dipole for sound elevation of the soundfield;

wherein the first frequency range extends to higher frequencies than the second frequency range and a distance between the loudspeakers of the plurality of loudspeakers forming the first dipole is smaller than a distance between the loudspeakers of the plurality of loudspeakers forming the second dipole.

16. The method according to claim 15, wherein the first frequency range comprises a high frequency range and/or the second frequency range comprises a mid frequency range.

17. The method according to claim 15, wherein at least one loudspeaker of the first pair of the plurality of loudspeakers or the second pair of the plurality of loudspeakers is also a part of the third pair of the plurality of loudspeakers.

18. The method according to claim 15, wherein an arrangement of the loudspeakers of the plurality of loudspeakers forming the first dipole defines a first dipole orientation and an arrangement of the loudspeakers of the plurality of loudspeakers forming the third dipole defines a third dipole orientation, wherein a first dipole orientation angle ($\eta 1$) defined by the third dipole orientation relative to the first dipole orientation is in a range of $65° \leq \eta 1 \leq 115°$.

19. The method according to claim 15, wherein the plurality of input signals are further processed such that:

a fourth pair of the plurality of loudspeakers form a fourth dipole for crosstalk cancellation between left hand side signal components and right hand side signal components in a fourth frequency range of the soundfield;

wherein the fourth frequency range extends to higher frequencies than the second frequency range and a distance between the loudspeakers of the plurality of loudspeakers forming the fourth dipole is smaller than the distance between the loudspeakers of the plurality of loudspeakers forming the second dipole.

20. A non-transitory computer-readable storage medium carrying a program code thereon, which when executed by one or more processors, the program code causes the one or more processors to perform:

processing a plurality of input signals to obtain a plurality of output signals; and outputting the plurality of output signals to the plurality of loudspeakers, wherein the plurality of input signals are processed such that:

a first pair of the plurality of loudspeakers form a first dipole for crosstalk cancellation between left hand side signal components and right hand side signal components in a first frequency range of the soundfield;

a second pair of the plurality of loudspeakers form a second dipole for crosstalk cancellation between left hand side signal components and right hand side signal components in a second frequency range of the soundfield; and a third pair of the plurality of loudspeakers form a third dipole for sound elevation of the soundfield;

wherein the first frequency range extends to higher frequencies than the second frequency range and a distance between the loudspeakers of the plurality of loudspeakers forming the first dipole is smaller than a distance between the loudspeakers of the plurality of loudspeakers forming the second dipole; and wherein the non-transitory medium is in a housing arranged in an operation orientation having a substantially vertical main plane, the housing having an elliptical torus shape and a plurality of loudspeakers, wherein a first plurality of the plurality of loudspeakers are mounted on a coplanar surface of the housing and a second plurality of the plurality of loudspeakers are mounted on a periphery of the elliptical torus shape.

* * * * *